US009442934B2

(12) United States Patent
Matoba

(10) Patent No.: US 9,442,934 B2
(45) Date of Patent: Sep. 13, 2016

(54) DISTRIBUTED CACHE CONTROL TECHNIQUE

(75) Inventor: Kazumine Matoba, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 730 days.

(21) Appl. No.: 13/607,135

(22) Filed: Sep. 7, 2012

(65) Prior Publication Data

US 2013/0073666 A1  Mar. 21, 2013

(30) Foreign Application Priority Data

Sep. 20, 2011 (JP) ................. 2011-204583

(51) Int. Cl.
*G06F 15/167* (2006.01)
*H04W 4/00* (2009.01)
*G06F 17/30* (2006.01)

(52) U.S. Cl.
CPC ............... *G06F 17/30041* (2013.01)

(58) Field of Classification Search
CPC .................. H04L 67/1002; H04L 67/104
USPC .......................................... 709/213
See application file for complete search history.

(56) References Cited

U.S. PATENT DOCUMENTS

| | | | | |
|---|---|---|---|---|
| 5,740,369 A * | 4/1998 | Yokozawa | ............ | G06F 1/1626 235/382 |
| 8,489,629 B2 * | 7/2013 | Kamiwada | ........ | G06F 17/30867 707/769 |
| 2002/0016162 A1 | 2/2002 | Yoshihara et al. | | |
| 2004/0260769 A1 * | 12/2004 | Yamamoto | ........ | G06F 17/30902 709/203 |
| 2006/0202834 A1 * | 9/2006 | Moriwaki | ............. | G01D 21/00 340/573.1 |
| 2008/0216177 A1 | 9/2008 | Yokosato et al. | | |
| 2009/0037445 A1 * | 2/2009 | Ushiyama | ............. | H04L 67/104 |
| 2010/0312861 A1 * | 12/2010 | Kolhi | ...................... | H04L 67/28 709/219 |
| 2011/0055481 A1 * | 3/2011 | Murakami | .......... | G06F 12/0875 711/118 |
| 2012/0117240 A1 | 5/2012 | Omar | | |

(Continued)

FOREIGN PATENT DOCUMENTS

EP  1091521 A2  4/2001
JP  2001-111605 A  4/2001

(Continued)

OTHER PUBLICATIONS

Japanese Office Action mailed Apr. 14, 2015 for corresponding Japanese Patent Application No. 2011-204583, with Partial English Translation, 6 pages.

(Continued)

*Primary Examiner* — Waseem Ashraf
*Assistant Examiner* — Emad Siddiqi
(74) *Attorney, Agent, or Firm* — Fujitsu Patent Center

(57) ABSTRACT

A disclosed method include: receiving, an identifier of a user, an identifier of contents associated with the user and identification data concerning a sensor that read the identifier of the user; reading an identifier of a node associated with the received identification data or a combination of the received identification data and the received identifier of the user, from a data storage unit storing an identifier of a node that will cache contents to be outputted to a display device provided at a different position from a position of a sensor in association with identification data concerning the sensor or a combination of identification data concerning the sensor and an identifier of a user; and transmitting the received identifier of the user and an identifier of contents associated with the user to a node whose identifier was read.

6 Claims, 27 Drawing Sheets

(56) References Cited

U.S. PATENT DOCUMENTS

| | | | | |
|---|---|---|---|---|
| 2013/0003708 A1* | 1/2013 | Ko | ........................ | H04W 4/18 370/338 |
| 2013/0166699 A1* | 6/2013 | Derozard | ............ | H04L 12/2825 709/219 |

FOREIGN PATENT DOCUMENTS

| JP | 2002-034073 | | 1/2002 |
|---|---|---|---|
| JP | 2002-49766 | A | 2/2002 |
| JP | 2003-30037 | A | 1/2003 |
| JP | 2004-102950 | | 4/2004 |
| JP | 2004-287934 | | 10/2004 |
| JP | 2005-010970 | | 1/2005 |
| JP | 2006-196008 | A | 7/2006 |
| JP | 2008-210331 | A | 9/2008 |
| JP | 2009-110122 | A | 5/2009 |
| JP | 2009-193440 | A | 8/2009 |
| JP | 2009-210887 | | 9/2009 |
| WO | WO 02/41180 | | 5/2002 |
| WO | 2006/092840 | A1 | 9/2006 |

OTHER PUBLICATIONS

U.S. Non-Final Office Action mailed Mar. 20, 2015 for corresponding U.S. Appl. No. 13/719,401 (related), 8 pages.

Matoba, Kazumine et al, "Service Oriented Network Architecture for Scalable M2M and Sensor Network Services", Intelligence in Next Generation Networks (ICIN), 2011 15th International Conference on Oct. 4-7, 2011, pp. 35-40.

Japanese Office Action mailed Jun. 30, 2015 for corresponding Japanese Patent Application No. 2012-044716, with Partial English Translation, 7 pages.

* cited by examiner

| NODE ID | LocationID |
|---|---|
| A1 | StationA |
| A2 | StationA |
| B1 | StationB |

| USER ID | LocationID | LATEST UPDATE TIME |
|---|---|---|
| UserA | StationA | 2011.1.10 10:01:11 |
| UserB | StationA | 2011.1.10 10:01:12 |
| UserC | StationB | 2011.1.10 10:01:11 |

| USER ID | CID | OUTPUT CONDITION |
|---|---|---|
| UserA | X | temp=cold |
| UserA | Y | temp=hot |
| UserB | Z | temp=cold |

| USER ID | OUTPUT CONDITION | GUARANTEED TIME LIMIT OF RETENTION | CID |
|---|---|---|---|
| UserA | temp=cold | 2011.1.10 11:01:11 | X |
| UserA | temp=hot | 2011.1.10 11:01:12 | Y |

| USER ID | Location ID | NODE ID |
|---------|-------------|---------|
| UserA | StationA | A1 |
| UserA | StationB | B1 |
| UserB | StationA | A2 |

| NODE ID | LocationID | NODE ID OF UPPER-LEVEL RELAY NODE |
|---|---|---|
| A1 | StationA | A100 |
| A2 | StationA | A100 |
| B1 | StationB | -- |

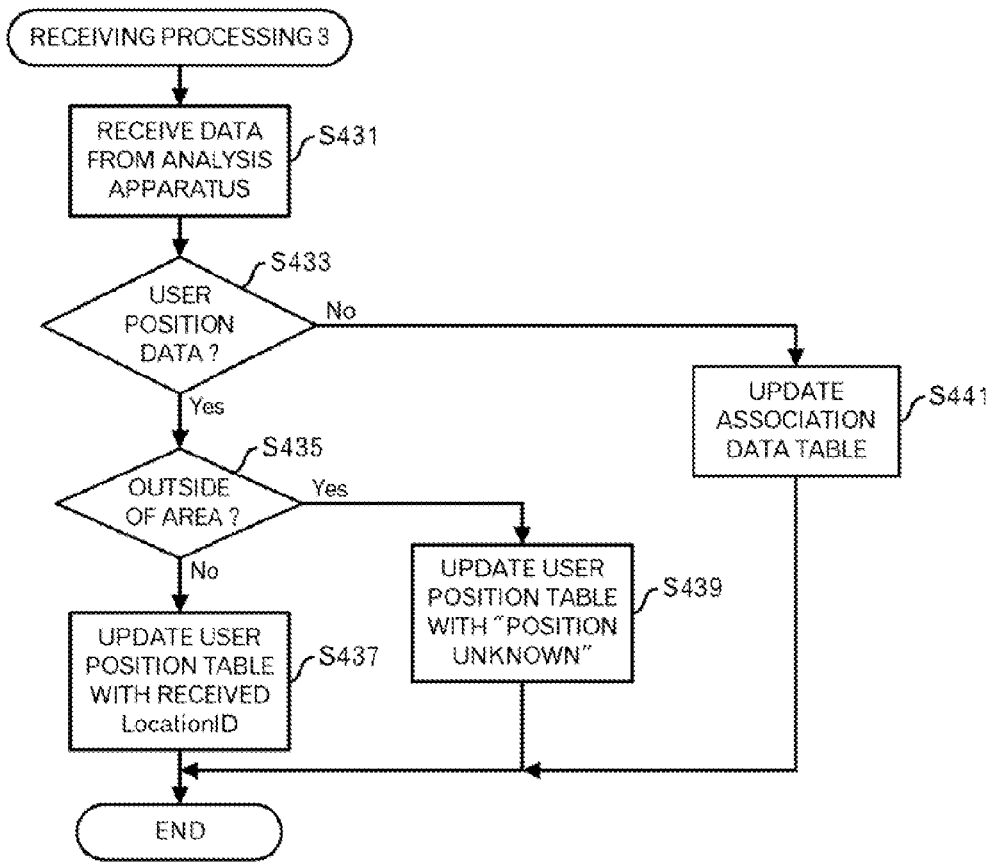

DISTRIBUTED CACHE CONTROL TECHNIQUE

CROSS-REFERENCE TO RELATED APPLICATIONS

This application is based upon and claims the benefit of priority of the prior Japanese Patent Application No. 2011-204583, filed on Sep. 20, 2011, the entire contents of which are incorporated herein by reference.

FIELD

This technique relates to a technique for caching contents data in a distributed manner.

BACKGROUND

For example, by a system for delivering an appropriate advertisement according to user's attributes and/or status such as a behavioral targeting advertisement system, preferable advertisements are delivered to the user.

In such a system, it is requested that the contents are delivered and displayed in real time. For example, when the advertisement is displayed at a vending machine provided in the station precincts, the user watches the panel only several seconds. Therefore, when a following sequential processing has not been completed within several seconds, the user does not watch it. More specifically, when a user identifier (ID) is inputted, the contents to be displayed are determined, and the contents are delivered to the vending machine to display the contents on a display device of the vending machine.

However, when the contents to be displayed are determined to deliver the determined contents to the vending machine by using server resources, which are remotely disposed in one data center, the delay of the communication, the congestion of the network due to the traffic concentration, and the heavy load on the servers are problems.

In order to solve the problems, an application of a distributed cache technique is considered. For example, plural cache servers connected to plural clients and a control server for controlling the plural cache server are provided in a system. Then, the control server predicts data to which an access will be requested in future by the cache server, and copies the predicted data to the cache server that has not requested to access the predicted data, yet. By carrying out such a processing, the access to the data is carried out at high speed, and the load of the server is reduced. However, because the access history is used to carry out the prediction, the contents to which no access has been made are not copied to the cache server. When the contents, which are not copied, are displayed, the contents, which are stored in a remote location, are obtained and displayed. Therefore, it takes a long time.

On the other hand, a technique exists to provide community information that matches a user more by considering the respective user's community-oriented degree and/or visiting schedules or other user's profile and/or interests and preferences. More specifically, (A) position information of a moving person or object and time information are simultaneously obtained, (B) a moving range having a time axis is extracted from sets including the obtained position information and time information, (C) the community information is obtained, (D) the moving range information is matched with the community information, and (E) the matched information is displayed.

Furthermore, an advertisement delivery system is known that has plural display device to display advertisements, and an advertisement delivery apparatus that selects an advertisement for a user based on information concerning purchase history stored in a portable terminal of the user and delivers the selected advertisement to the display device. In this system, the display device receives information including the purchase history from the user's portable terminal, which is adjacent to the display device, and sends the received information as the purchase history and user position information representing the user's location to the advertisement delivery apparatus. The advertisement delivery apparatus receives the purchase history and user's position information from the portable terminal, analyzes plural items in the purchase history, and extracts information concerning products to be displayed as the advertisement from the purchase history. Then, the advertisement delivery apparatus selects a product to be displayed as the advertisement from information of the extracted products, and obtains the advertisement relating to the product from an advertisement repository storing advertisement contents. After that, the advertisement delivery apparatus determines a display device that will be next adjacent to the user, based on the user position information, and sends the advertisement contents obtained from the advertisement repository to the determined display device. However, this does not consider the utilization of the cache, and a problem concerning the delay of the display occurs.

In other words, there is no conventional technique for caching the contents that may be displayed to the user in an early stage.

SUMMARY

A control method relating to a first aspect of this technique include (A) receiving, an identifier of a user, an identifier of contents associated with the user and identification data concerning a sensor that read the identifier of the user; (B) reading an identifier of a node associated with the received identification data or a combination of the received identification data and the received identifier of the user, from a data storage unit storing an identifier of a node that will cache contents to be outputted to a display device provided at a different position from a position of a sensor in association with identification data concerning the sensor or a combination of identification data concerning the sensor and an identifier of a user; and (C) transmitting the received identifier of the user and an identifier of contents associated with the user to a node whose identifier was read.

A control method relating to a second aspect of this technique includes: (A) receiving, from a second computer, an identifier of a user, an identifier of contents associated with the user and an output condition of the contents; (B) storing the identifier of the contents associated with the user and the output condition of the contents in association with the identifier of the user into a data storage unit; obtaining the contents associated with the user from a third computer by using the identifier of the contents associated with the user; (C) storing the obtained contents into the data storage unit; (D) receiving, from a display device connected to the first computer, the identifier of the user and state data; (E) reading, from the data storage unit, contents whose identifier is associated with an output condition that the received state data satisfies and the identifier of the user; and (F) outputting the read contents to the display device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 34 is a diagram depicting a processing flow of a receiving processing in an eighth embodiment;

FIG. 35 is a diagram depicting an example of a user position table in the eighth embodiment;

FIG. 36 is a diagram depicting an example of an association data table relating to the eighth embodiment;

DESCRIPTION OF EMBODIMENTS

Embodiment 1

Figure 1:
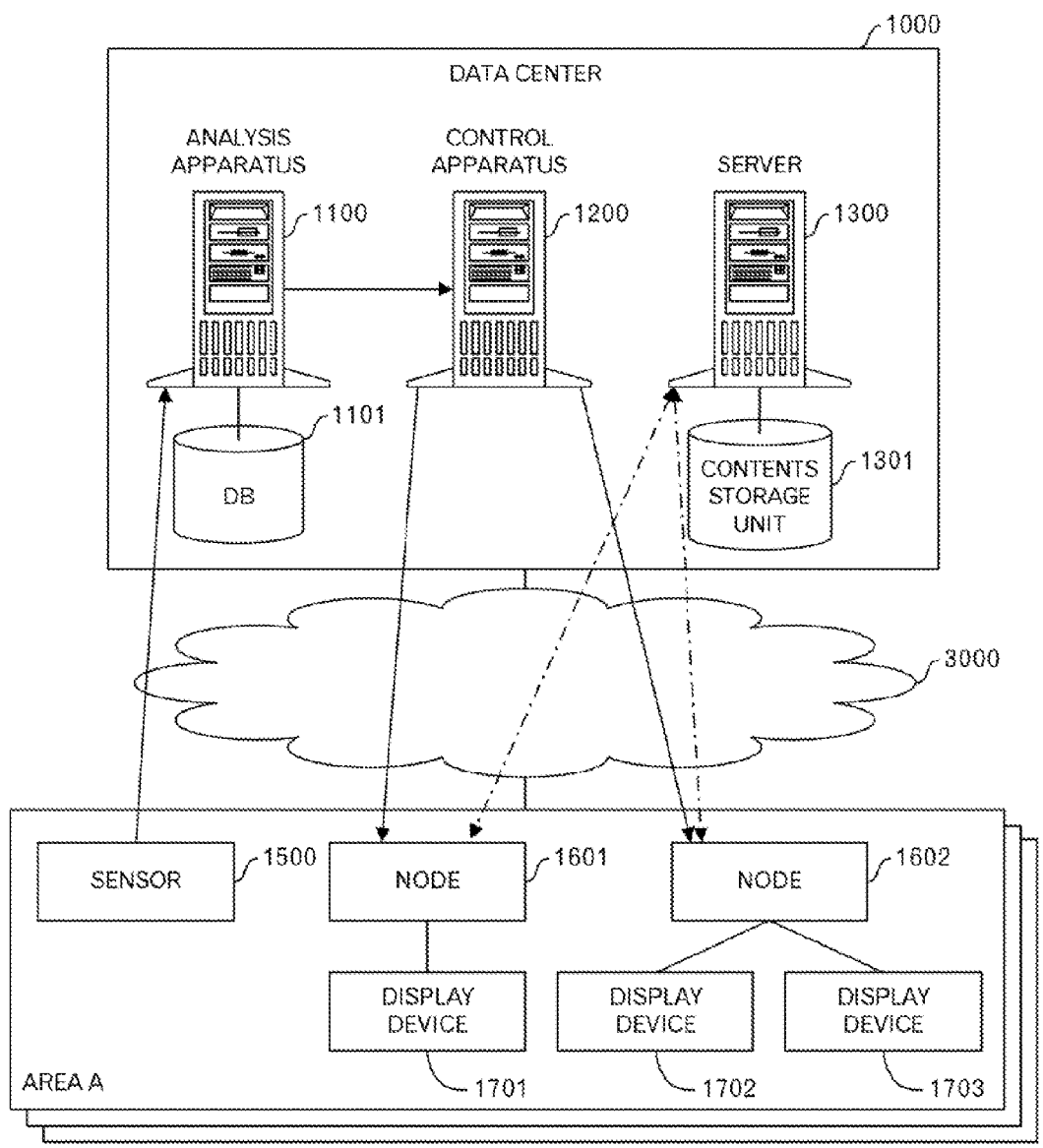
FIG. 1 is a diagram depicting a system outline relating to a first embodiment.

FIG. 1 illustrates a system outline in this embodiment. For example, an analysis apparatus 1100, control apparatus 1200 and a server 1300 are provided in a data center 1000. The analysis apparatus 1100 has a database (DB) 1101 storing contents IDs to be delivered in association with a user ID. Moreover, the server 1300 manages a contents storage unit 1301 storing the contents. The data center 1000 is connected through a network 3000 such as the Internet to sensors and nodes provided in one or plural areas (FIG. 1 only illustrates an area A).

In each area, one or plural sensors 1500, one or plural nodes 1601 and 1602 that caches contents to be displayed to users, and display devices 1701 to 1703 connected to either of the nodes 1601 and 1602 are provided. One or plural display devices are connected to each node. The sensor 1500 reads a user identifier (ID) from an non-contact type IC card, for example, that the user has, and outputs the user ID together with an identifier (ID) of the area in which the sensor 1500 is provided (or identifier (ID) of the sensor 1500) to the analysis apparatus 1100 through the network 3000. The nodes 1601 and 1602 obtain and cache data of the contents from the server 1300 in response to an instruction from the control apparatus 1200. The display devices 1701 to 1703 are disposed on positions different from the sensor 1500 in the area. The sensor 1500 is disposed at an entrance of the area, for example, and the display devices 1701 to 1703 are disposed at places where the user stops in the area. In addition, the display devices 1701 to 1703 have a sensor that read a user ID from the non-contact type IC card that the user has. The display devices 1701 to 1703 may have other sensors. For example, the display device 1701 reads out the user ID, and outputs the user ID to the node 1601 being connected. In response to receipt of the user ID, the node 1601 identifies data of the contents corresponding to the user ID from the cache, and outputs the data of the contents to the display device 1701. The display device 1701 receives the data of the contents, and displays the received data of the contents.

Figures 2, 3, 4:
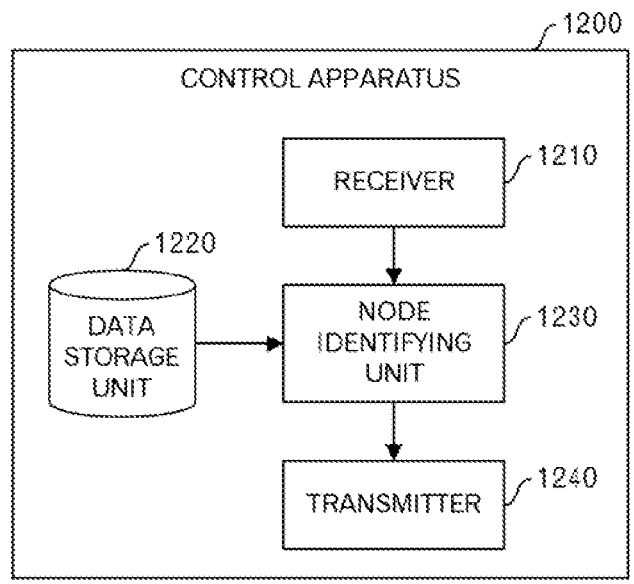
FIG. 2 is a functional block diagram of a control apparatus relating to the first embodiment.
FIG. 3 is a diagram depicting an example of data stored in a data storage unit of the control apparatus.
FIG. 4 is a diagram depicting an example of data stored in the data storage unit of the control apparatus.

FIG. 2 illustrates a functional block diagram of the control apparatus 1200 in this embodiment. The control apparatus 1200 has a receiver 1210, a data storage unit 1220, a node identifying unit 1230 and a transmitter 1240. The receiver 1210 receives a user ID, an area ID, and a contents ID corresponding to the user ID from the analysis apparatus 1100, and outputs the received data to the node identifying unit 1230. The node identifying unit 1230 searches the data storage unit 1220 by the area ID or a combination of the area ID and user ID to read an applicable node ID, and outputs the node ID and a combination of the user ID and the contents ID to the transmitter 1240. The transmitter 1240 transmits the combination of the user ID and contents ID to a node identified by the node ID.

The data storage unit 1220 stores data as illustrated in FIG. 3, for example. In an example of FIG. 3, an node ID of a node disposed in an area is registered in association with the area ID. Incidentally, the data storage unit 1220 may store data as illustrated in FIG. 4, for example. In this example, the node ID is registered in association with the combination of the area ID and user ID. For example, when a user X comes to a certain area A, and it is known that possibility that the user X uses the node a2 is high, such data may be used.

Figure 5:
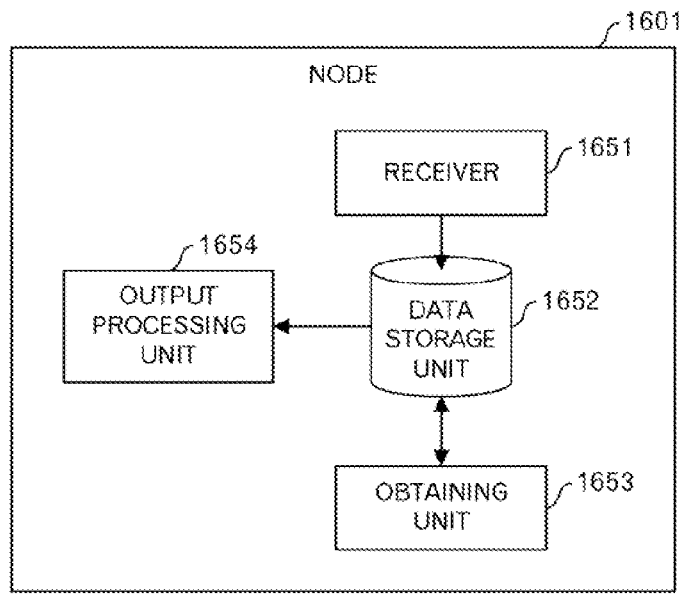
FIG. 5 is a functional block diagram of a node relating to the first embodiment.

In addition, FIG. 5 illustrates a functional block diagram of the node 1601 in this embodiment. The node 1601 has a receiver 1651, a data storage unit 1652, an obtaining unit 1653 and an output processing unit 1654. When the receiver 1651 receives a combination of the user ID and contents ID from the control apparatus 1200, the receiver 1651 stores the received data into the data storage unit 1652. When a new contents ID is stored in the data storage unit 1652, the obtaining unit 1653 obtains data of the contents corresponding to the contents ID from the server 1300, and stores the received data of the contents into the data storage unit 1652. By carrying out such a processing, the preparation of the cache in the node 1601 is completed. Then, when the user ID is received from the display device 1701, the output processing unit 1654 identifies a contents ID corresponding to the user ID by searching the data storage unit 1652 by the user ID to read data of the contents corresponding to the identified contents ID, and outputs the data of the contents to the display device 1701.

Figure 6:
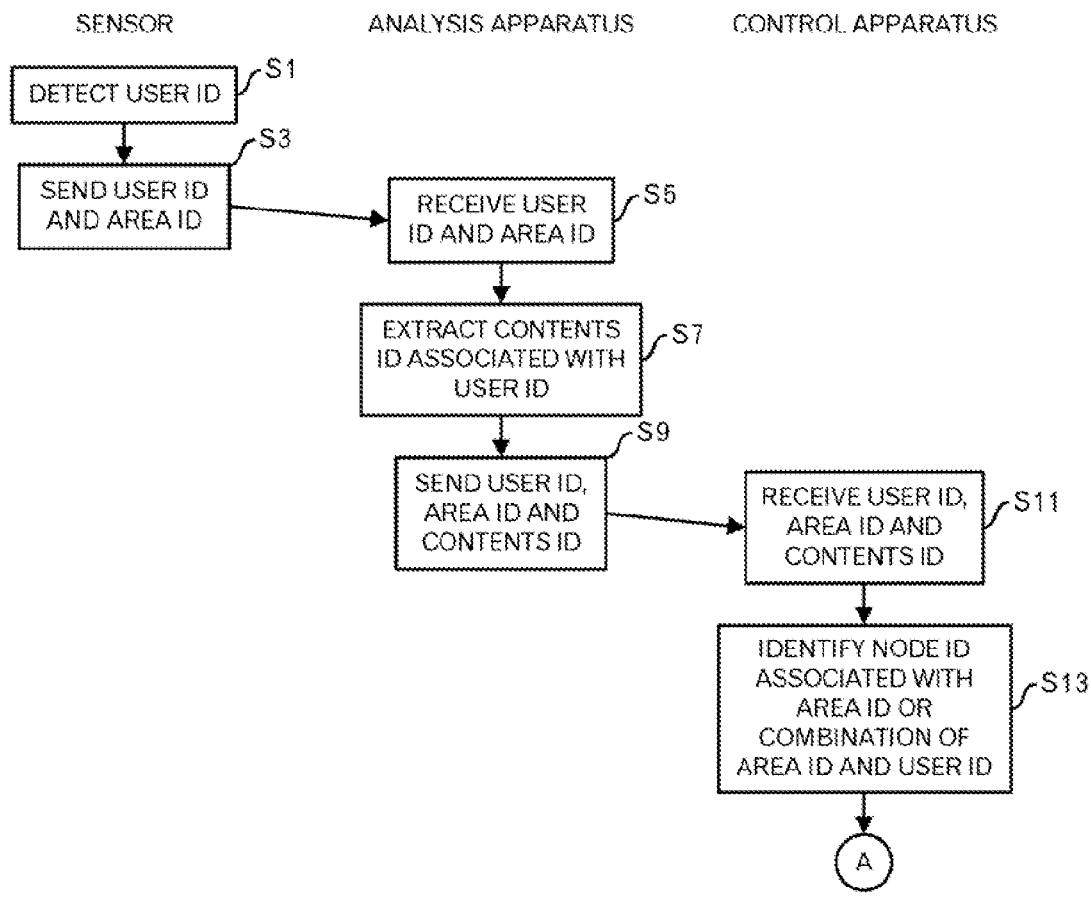
FIG. 6 is a diagram depicting a processing flow of a processing in the first embodiment.

Next, a processing in this system will be explained by using FIGS. 6 and 7. The user comes to a place where the sensor 1500 is provided, for example, at the entrance of the area A, and puts an IC card or the like on the sensor 1500. Then, the sensor 1500 reads the user ID from the IC card or the like that the user has (FIG. 6: step S1), and transmits the read user ID and an area ID of the area in which the sensor 1500 is provided (in some cases, an ID of the sensor 1500) to the analysis apparatus 1100 (step S3). The analysis apparatus 1100 receives the user ID and area ID from the sensor 1500 (step S5), searches the DB 1101 by the user ID, and extracts the contents ID corresponding to the user ID (step S7). Incidentally, there is a case where any output condition (e.g. temperature condition) is attached, and in such a case, the contents ID and output condition are extracted together. For example, when the contents P are outputted in case of high temperature, and the contents Q are outputted in case of low temperature, two contents IDs are extracted with their output conditions. Moreover, when the sensor ID is received from the sensor 1500, the received sensor ID may be converted to the area ID from the association of the sensor ID with the area ID.

Then, the analysis apparatus 1100 transmits the user ID, area ID and contents ID to the control apparatus 1200 (step S9). When the receiver 1210 of the control apparatus 1200 receives the user ID, area ID and contents ID from the analysis apparatus 1100 (step S11), the receiver 1201 outputs the user ID, area ID and contents ID to the node identifying unit 1230. The node identifying unit 1230 identifies one or plural node IDs associated with the area ID or a combination of the area ID and user ID in the data storage unit 1220, and outputs the user ID, contents ID and node ID to the transmitter 1240 (step S13). Then, the processing shifts to a processing of FIG. 7 through a terminal A.

Figure 7:
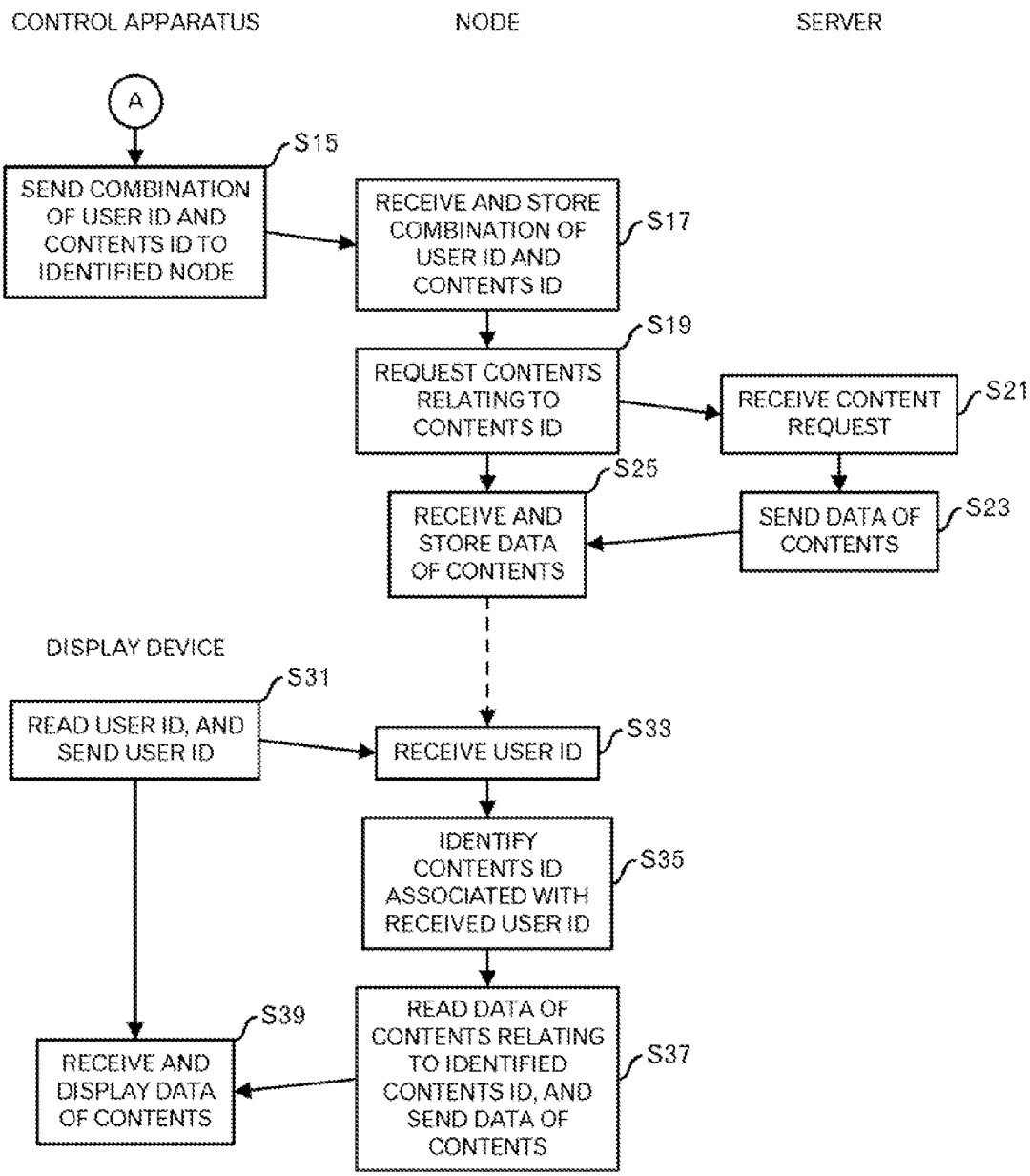
FIG. 7 is a diagram depicting a processing flow of a processing in the first embodiment.

Shifting to an explanation of the processing in FIG. 7, the transmitter 1240 of the control apparatus 1200 transmits the combination of the user ID and contents ID to a node identified from the node ID obtained from the node identifying unit 1230 (step S15). For example, when the receiver 1651 of the node 1601 in the area A receives the combination of the user ID and contents ID from the control apparatus 1200, the receiver 1651 stores the received data into the data storage unit 1652 (step S17). Then, the obtaining unit 1653 confirms whether or not data of the contents relating to the contents ID newly stored in the data storage unit 1652 is stored in the data storage unit 1652. When the aforementioned data of the contents is not stored in the data storage unit 1652, the obtaining unit 1653 transmits a request of the contents relating to the contents ID to the server 1300 (step S19). When the server 1300 receives the request of the contents, which includes the contents ID, from the node 1601 (step S21), the server 1300 reads out data of the contents from the contents storage unit 1301, and transmits the read data of the contents to the node 1601 (step S23). When the obtaining unit 1653 of the node 1601 receives the data of the contents from the server 1300, the obtaining unit 1653 stores the received data into the data storage unit 1652 (step S25). By carrying out such a processing, when the user moves to a place where the display devices 1701 to 1703 are provided, the contents have been cached in the data storage unit 1652. Therefore, appropriate contents can be immediately displayed to the user.

In other words, the display device 1701 reads a user ID from the IC card or the like that the user has, and transmits the read user ID to the node 1601 being connected (step S31). When the output processing unit 1654 of the node 1601 receives the user ID from the display device 1701 (step S33), the output processing unit 1654 identifies a contents ID associated with the received user ID in the data storage unit 1652 (step S35). Here, the contents ID may be returned to the display device 1701, and when the request of the contents relating to the contents ID is received from the display device 1701 again, the following processing may be carried out.

Then, the output processing unit 1654 reads data of the contents relating to the identified contents ID from the data storage unit 1652, and transmits the read data of the contents to the requesting source display device 1701 (step S37). Then, when the display device 1701 receives the data of the contents from the node 1601, the display device 1701 displays the data of the contents on a display unit (step S39).

By carrying out the aforementioned processing, data for the user whose entry is detected by the sensor 1500 is cached in advance to the nodes 1601 and 1602 connected to the display devices 1701 to 1703, which are disposed near the sensor 1500 or at associated positions. Therefore, when it is detected that the user arrived at the display device 1701, it is possible to display appropriate contents on the display device 1701, immediately.

Incidentally, when a temperature sensor is equipped on the display device 1701, and state data from the temperature sensor is outputted to the node 1601 together with the user ID, a contents ID corresponding to the user ID and an output condition that the state data satisfies may be identified, and the contents relating to the contents ID may be transmitted to the display device 1701.

Embodiment 2

Figure 8:
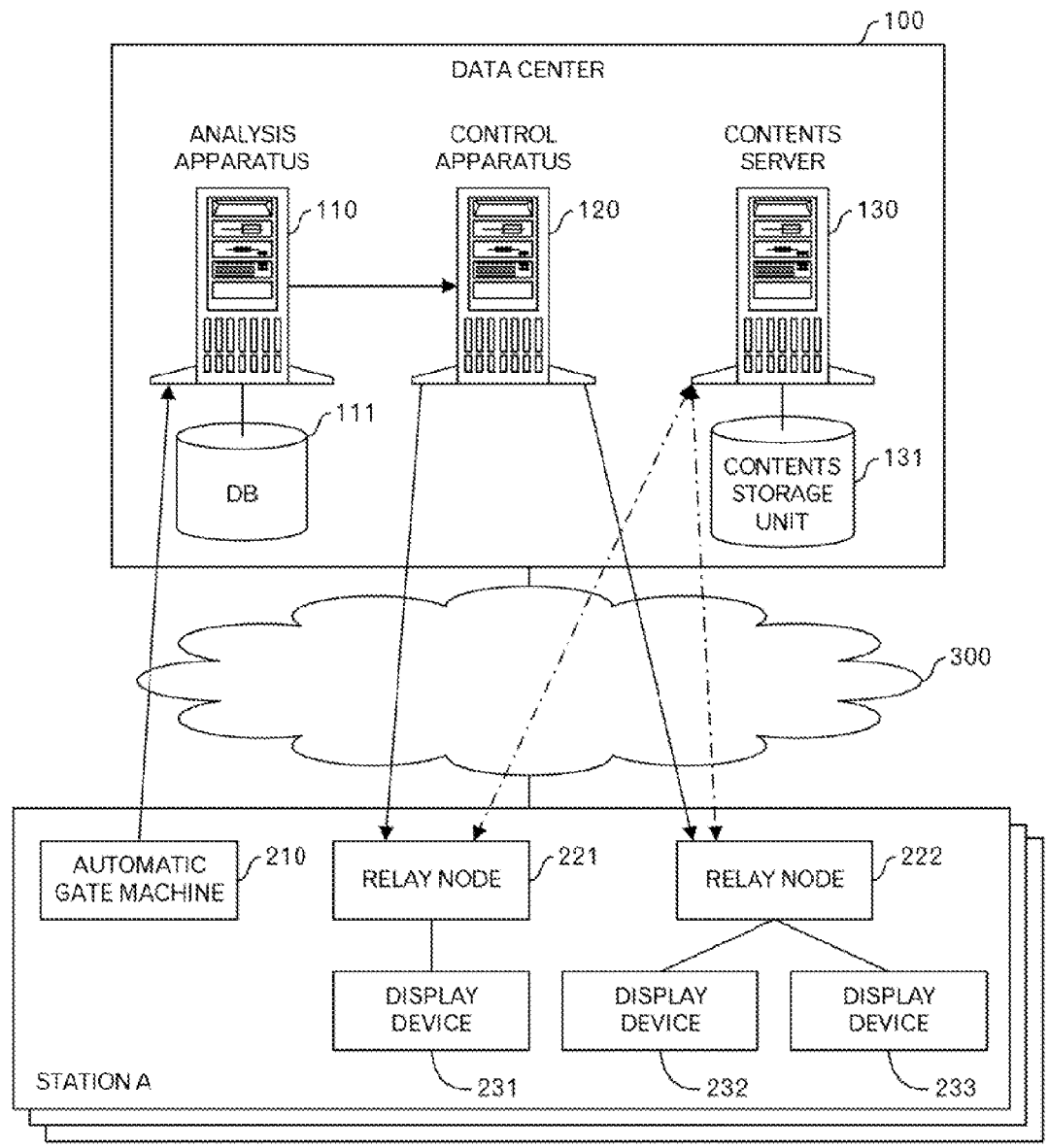
FIG. 8 is a diagram depicting a system outline relating to a second embodiment.

FIG. 8 illustrates an outline of a system relating to this embodiment. For example, an analysis apparatus 110, control apparatus 120 and contents server 130 are provided in a data center 100. The analysis apparatus 110 has a database (DB) 111 storing an output condition and an ID of contents to be outputted in association with a user ID. Moreover, the contents server 130 manages a contents storage unit 131 storing the contents. The data center 100 is connected to an automatic gate machine 210, which is provided, for example, in one or plural stations (in FIG. 8, only station A is illustrated) and relay nodes 221 and 222 through a network 300 such as the Internet. Incidentally, instead of the station, a shopping center, department store, super market, amusement park, zoo and other commercial facilities may be applicable.

For example, in each station, one or plural automatic gate machines 210, one or plural relay nodes 221 and 222 that caches the contents to be displayed to the user, and display devices 231 to 233 connected to either of the relay nodes 221 and 222 are provided. One or plural display devices are connected to each relay node. The automatic gate machine 210 reads a user ID from an non-contact type IC card or the like that the user has, and outputs the user ID with an identifier (ID) of the station in which the automatic gate machine 210 is provided (or identifier of the automatic gate machine 210) to the analysis apparatus 110 through the network 300.

The relay nodes 221 and 222 obtain and cache data of the contents from the contents server 130 in response to an instruction from the control apparatus 120. The display devices 231 to 233 are disposed on positions different from the automatic gate machine 210.

The automatic gate machine 210 is disposed at places where the arrival or departure to or from the station precinct is detected, and the display devices 231 to 233 are disposed at places where the user frequently stands in the station precinct. Moreover, the display devices 231 to 233 have a sensor that reads the user ID from the non-contact type IC card that the user has, and other sensor such as a temperature sensor. For example, when the display device 231 reads the user ID, the display device 231 obtains state data from other sensor such as the temperature sensor, and outputs the user ID and state data to the relay node 221 being connected. In response to receipt of the data, the relay node 221 reads data of the contents corresponding to the user ID and an output condition that the state data satisfies from the cache, and outputs the data of the contents to the display device 231. When the display device 231 receives the data of the contents, the display device 231 displays the received data onto a display unit.

Figures 9, 10:
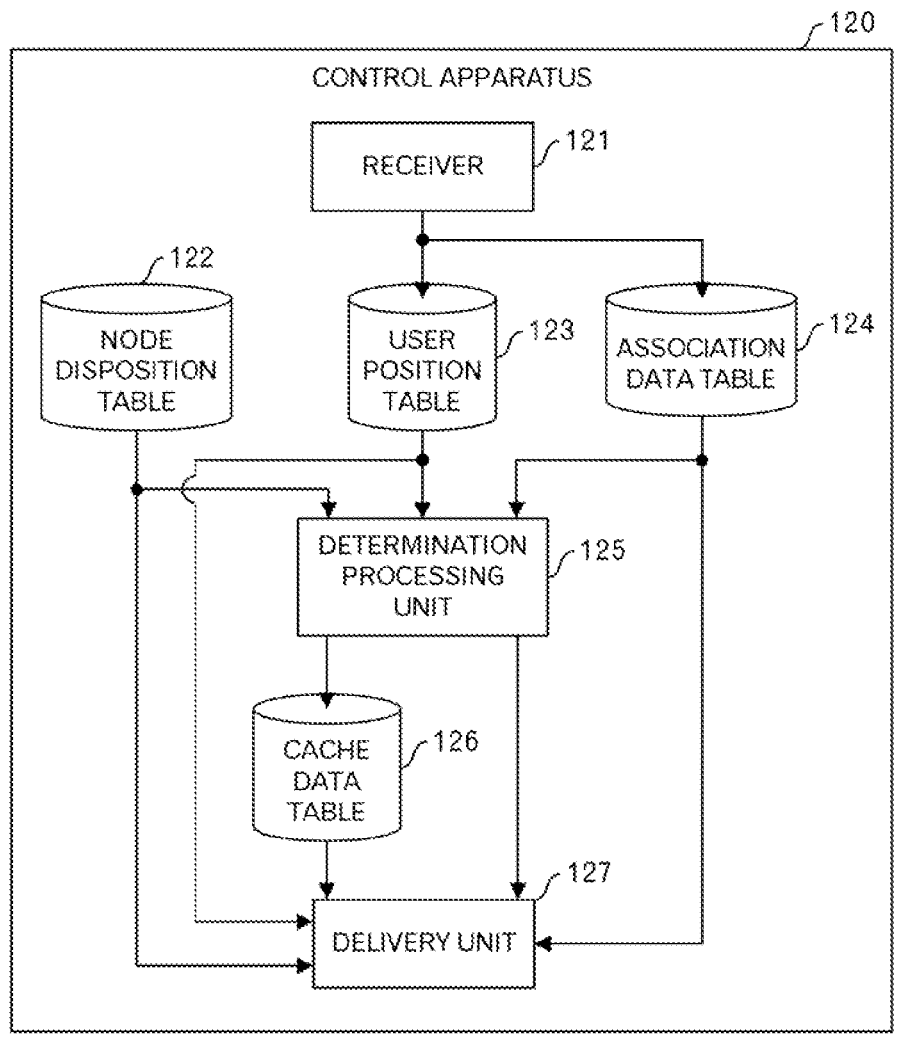
FIG. 9 is a functional block diagram of the control apparatus relating to the second embodiment.
FIG. 10 is a diagram depicting an example of a node disposition table.

FIG. 9 illustrates a functional block diagram of the control apparatus 120. The control apparatus 120 has a receiver 121, node disposition table 122, user position table 123, association data table 124, determination processing unit 125, cache data table 126 and delivery unit 127. The receiver 121 receives data from the analysis apparatus 110, and stores received data into the user position table 123 or association data table 124. The user position table 123 is a table storing position data for each user. The association data table 124 is a table storing association data of the user ID, outputs conditions and contents ID. The determination processing unit 125 correlates the node ID of the relay node and ID of the contents to be cached to the relay node from the node deposition table 122, the association data table 124 and user position table 123, and stores the correlation data in the cache data table 126. The delivery unit 127 generates definition data including the association data from the association data table 124, user position table 123 and the node disposition table 122, identifies a delivery destination node of the definition data, and transmits the definition data to the delivery destination node.

FIG. 10 illustrates an example of the node disposition table 122. In an example of FIG. 10, a node ID that is an ID of a relay node and LocationID that is an ID of a station in which the automatic gate machine is provided (typically, area in which the sensor that reads the user ID is provided) are correlated and stored. For example, StationA that is LocationID representing a station A is correlated and registered with A1 and A2 that are node IDs.

Figures 11, 12, 13:
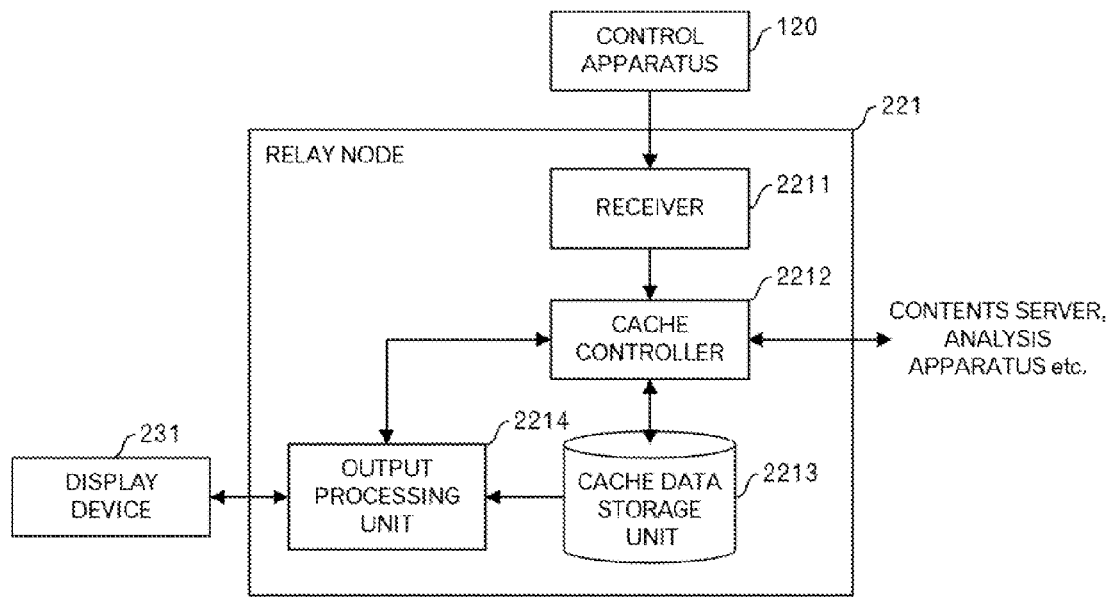
FIG. 11 is a diagram depicting an example of a user position table.
FIG. 12 is a diagram depicting an example of an association data table.
FIG. 13 is a functional block diagram of a relay node relating to the second embodiment.

FIG. 11 illustrates an example of the user position table 123. In an example of FIG. 11, the user ID that is a user's ID, LocationID that is an ID of the station, in which the automatic gate machine is provided, and the latest update time are registered. Here, for each user ID, LocationID and the latest update time are registered. However, the history of the movement may be stored.

FIG. 12 illustrates an example of the association data table 124. In an example of FIG. 12, the user ID, CID that is an identifier of the contents, and the output condition are correlated and stored. For example, the association data is registered so that, when the output condition temp=cold representing a condition that the temperature is less than 25 degrees, contents whose CID is X are outputted to a user whose user ID is UserA, and when the output condition temp=hot representing a condition that the temperature is equal or greater than 25 degrees, contents whose CID is Y are outputted to the same user. Incidentally, CID is represented by, for example, Uniform Resource Locator (URL). In other words, CID includes an address of a server from which the contents are obtained.

Next, FIG. 13 illustrates a functional block diagram of one of the relay nodes 221 to 222. The relay node 221 has a receiver 2211, cache controller 2212, cache data storage unit 2213 and output processing unit 2214. The receiver 2211 receives the definition data including the association data from the control apparatus 120, and outputs the received definition data to the cache controller 2212. The cache controller 2212 receives the definition data from the receiver 2211, and stores the definition data into the cache data storage unit 2213. Moreover, when data of the contents relating to CID included in the definition data are not stored in the cache data storage unit 2213, the cache controller 2212 obtains the data of the contents from the contents server 130, other relay nodes or the like, and stores the data of the contents into the cache data storage unit 2213. Incidentally, when the definition data itself is not stored in the cache data storage unit 2213, the cache controller 2212 may obtains the association data from the analysis apparatus 110. Furthermore, the output processing unit 2214 identifies contents that are assumed to be appropriate for the user relating to the user ID at present in the cache data storage unit 2213 according to the user ID and state data from the display device 231, and outputs data of the identified contents to the display device 231. Incidentally, when data is insufficient in the cache data storage unit 2213, the output processing unit 2214 requests the cache controller 2212.

Figures 14, 16:
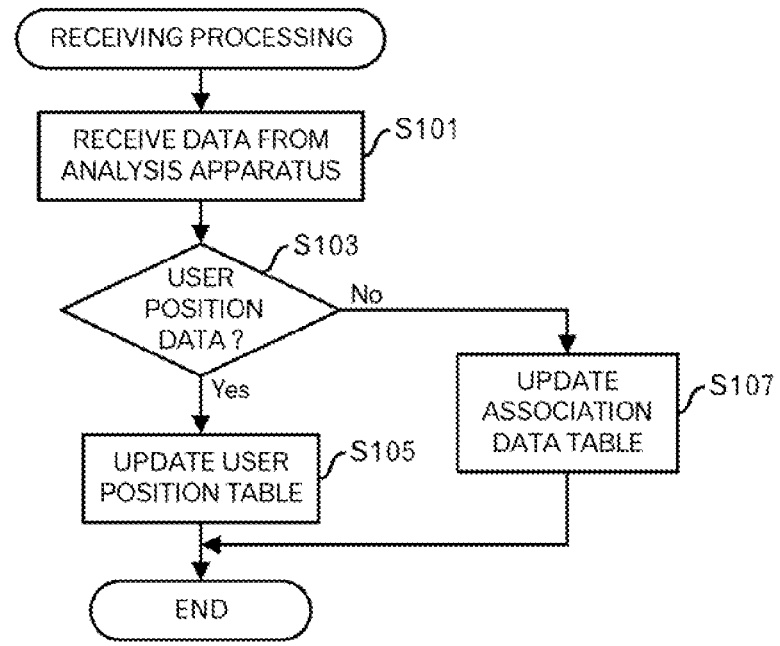
FIG. 14 is a diagram depicting a processing flow of a receiving processing in the second embodiment.
FIG. 16 is a diagram depicting an example of a cache data table.

Next, a processing in the control apparatus 120 will be explained by using FIGS. 14 to 23. First, FIG. 14 illustrates a processing flow of a processing by the receiver 121 in the control apparatus 120. Before this processing, the automatic gate machine 210 reads the user ID from the IC card or the like that the user has, and transmits the user ID and LocationID to the analysis apparatus 110. The analysis apparatus 110 reads data of CID and data of the output condition, which correspond to the received user ID, from the DB 111, and transmits the user ID and LocationID and the user ID, CID and data of the output condition to the control apparatus 120.

Then, when the receiver 121 of the control apparatus 120 receives data from the analysis apparatus 110 (FIG. 14: step S101), the receiver 121 determines whether or not the received data is user position data (step S103). In this embodiment, association data including the user position data including the user ID and LocationID and the user ID, CID and data of the output condition are transmitted from the analysis apparatus 110. When the received data is the user position data, the receiver 121 registers the received LocationID in the user position table 123 in association with the received user ID, and registers the present time as the latest update time (step S105). When the received user ID is already registered, the entry of the received user ID is updated with the received LocationID and the present time. On the other hand, when the received data is the association data, the receiver 121 updates the association data table 124 with the user ID, CID and data of the output condition (step S107). For example, the user ID, CID and data of the output condition are additionally registered in the association data table 124. However, when a record for the received user ID is already registered, the overwriting may be carried out.

Figure 15:
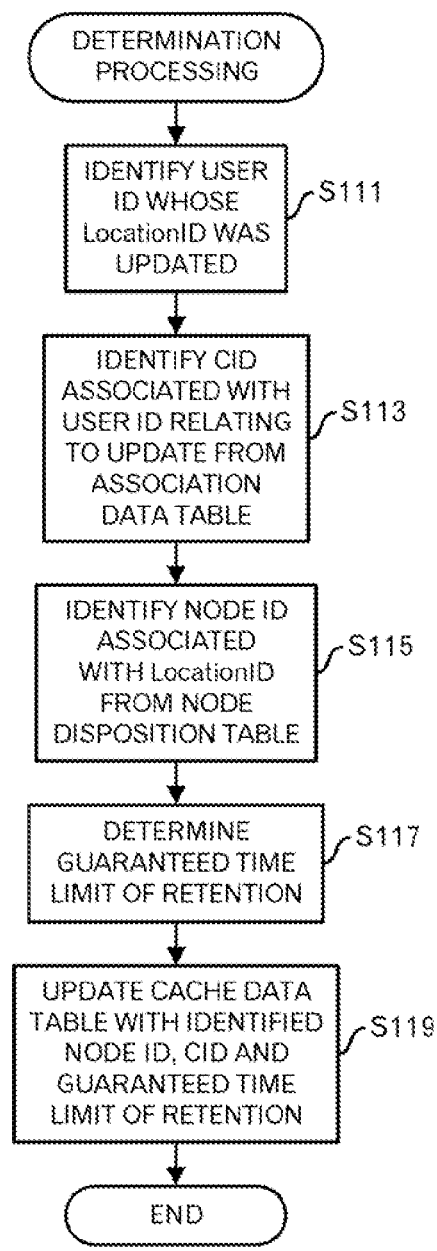
FIG. 15 is a diagram depicting a processing flow of a determination processing in the second embodiment.

Next, FIG. 15 illustrates a processing flow of a processing by the determination processing unit 125 in the control apparatus 120. The determination processing unit 125 identifies the user ID whose LocationID was updated in the user position table 123 (FIG. 15: step S111). Moreover, the determination processing unit 125 identifies the CID associated with the user ID relating to the update from the association data table 124 (step S113). Then, the determination processing unit 125 identifies the node ID corresponding to the LocationID from the node disposition table 122 (step S115).

Moreover, the determination processing unit 125 determines a time after a predetermined time (e.g. one hour) since the present time, for example, as guaranteed time limit of retention of the contents in the relay node (step S117). Instead of setting the time after a fixed time, the predetermined time may be changed according to the user. More specifically, when there is designation of the predetermined time from the analysis apparatus 110, the predetermined time may be adopted according to the designation. In addition, when data concerning the stay time of the user exists in the control apparatus 120, such data may be used. After that, the determination processing unit 125 updates the cache data table 126 with the identified node ID, CID and the guaranteed time limit of retention.

The cache data table 126 stores data as illustrated in FIG. 16, for example. In an example of FIG. 16, the node ID, CID and the guaranteed time limit of retention are registered. When plural CIDs are identified at the step S113 and plural node IDs are identified at the step S115, combinations of those are registered in the cache data table 126. For example, when the node IDs are A1 and A2, and the CIDs are X and Y, an entry of A1 and X, entry of A1 and Y, entry of A2 and X and entry of A2 and Y are registered. Incidentally, when the entry of the same combination of the node ID and CID has already been registered, the guaranteed time limit of retention is updated.

Moreover, it is assumed that the entry in the cache data table 126 is automatically deleted when the guaranteed time limit of retention elapsed.

Figure 17:
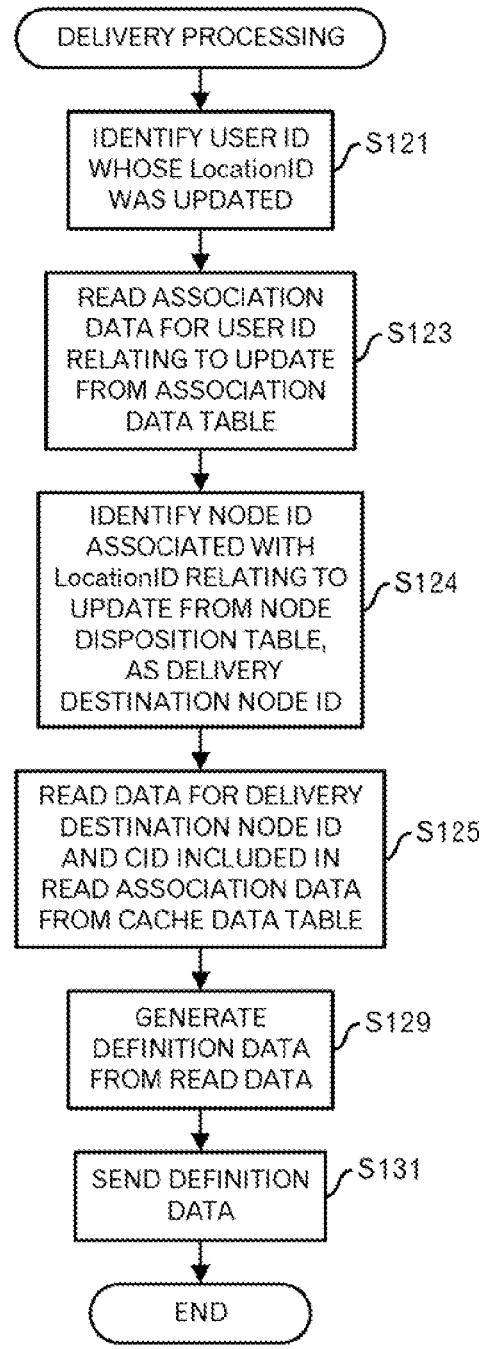
FIG. 17 is a diagram depicting a processing flow of a delivery processing in the second embodiment.

Next, a processing by the delivery unit 127 in the control apparatus 120 will be explained by using FIG. 17. The delivery unit 127 identifies the user ID whose LocationID was updated in the user position table 123 (FIG. 17: step S121). Incidentally, the user ID whose LocationID was updated may be notified from the determination processing unit 125. Then, the delivery unit 127 reads the association data for the user ID relating to the update from the association data table 124 (step S123). In other words, CID and data of the output condition, which correspond to the identified user ID, are read out.

Furthermore, the delivery unit 127 identifies the node ID corresponding to the LocationID relating to the update as the node ID of the delivery destination node from the node disposition table 122 (step S124). Then, the delivery unit 127 reads data for the node ID of the delivery destination node and the CID included in the read association data from the cache data table 126 (step S125). For example, when UserA is identified as the user ID relating to the update, the association data in the first and second lines in the association data table 124 (FIG. 12) is identified, and the nodes A1 and A2 in the first and second lines in the node disposition table 122 (FIG. 10) are identified as the delivery destination nodes. Then, the entries of the first to fourth lines are identified in the cache data table 126 (FIG. 16).

Then, the delivery unit 127 generates definition data from the data read at the steps S123 and S125 (step S129), and transmits the definition data to the delivery destination node identified at the step S124 (step S131).

Figures 18, 19:
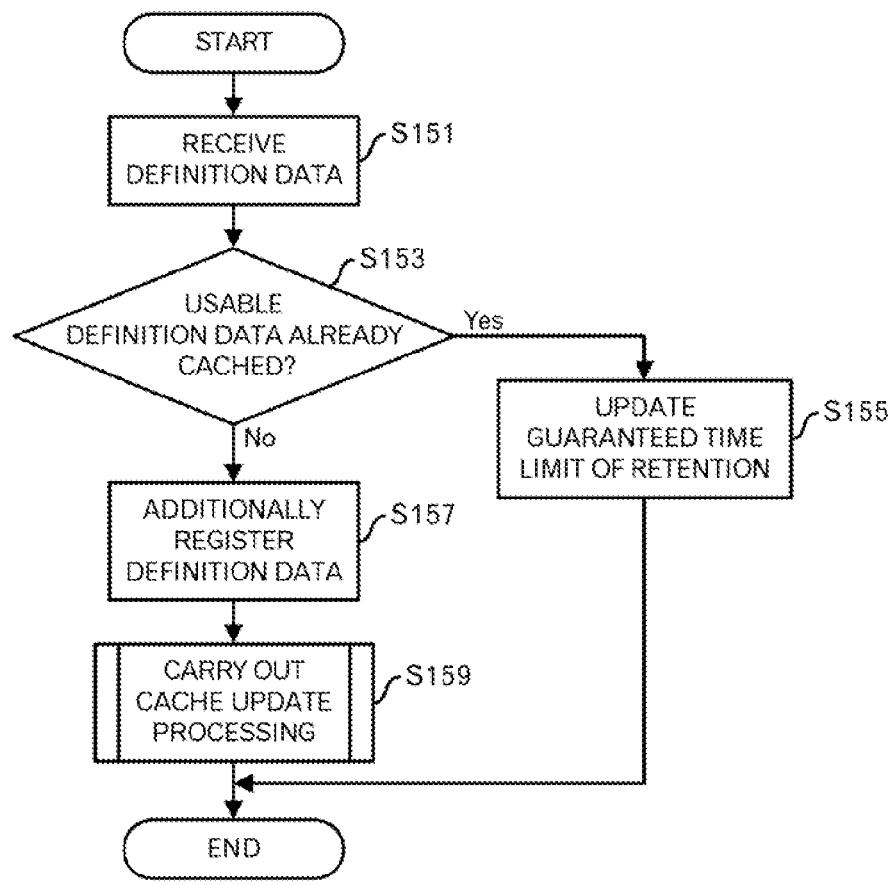
FIG. 18 is a diagram depicting an example of definition data.
FIG. 19 is a diagram depicting a processing flow of a processing by a receiver in the relay node.

The definition data is data as illustrated in FIG. 18, for example. In an example of FIG. 18, the definition data includes the user ID, data of the output condition, the guaranteed time limit of retention and CID. In case where such data is received, when the relay nodes 221 and 222 are requested from the display device 231, the relay nodes 221 and 222 can identify the contents to be displayed without acquiring the association data from the analysis apparatus 110. When the relay node 221 further carries out a processing described below in advance, it is possible to cache the contents themselves to be displayed in advance. Therefore, it is possible for the display device 231 to display appropriate contents to the user immediately.

Next, a processing by the relay node will be explained by using FIGS. 19 to 23. When the receiver 2211 of the relay node 221 receives the definition data from the control apparatus 120 (FIG. 19: step S151), the receiver 2211 outputs the definition data to the cache controller 2212. When the cache controller 2212 receives the definition data from the receiver 2211, the cache controller 2212 searches the cache data storage unit 2213 by the user ID included in the definition data, data of the output condition and CID, and determines whether or not an entry in which the data other than the guaranteed time limit of retention is the same exists, in other words, the usable definition data has already been cached (step S153). When the entry in which the data other than the guaranteed time limit of retention is the same has already been stored in the cache data storage unit 2213, and is usable, the cache controller 2212 updates the entry with the guaranteed time limit of retention included in the received definition data when the guaranteed time limit of retention, which is included in the received definition data, is later than the present guaranteed time limit of retention (step S155). The guaranteed time limit of retention, which is included in the entry for the CID included in the received definition data, is also updated. Then, the processing is completed.

On the other hand, when the combination of the user ID, data of the output condition and CID, which are included in the definition data, is not stored in the cache data storage unit 2213, the cache controller 2212 additionally registers the received definition data into the cache data storage unit 2213 (step S157). Furthermore, the cache controller 2212 carries out a cache update processing for the contents for CID included in the received definition data (step S159). Then, the processing is completed. Incidentally, the cache update processing will be explained by using FIG. 20. Moreover, the processing in FIG. 20 is carried out for each CID included in the definition data.

Figure 20:
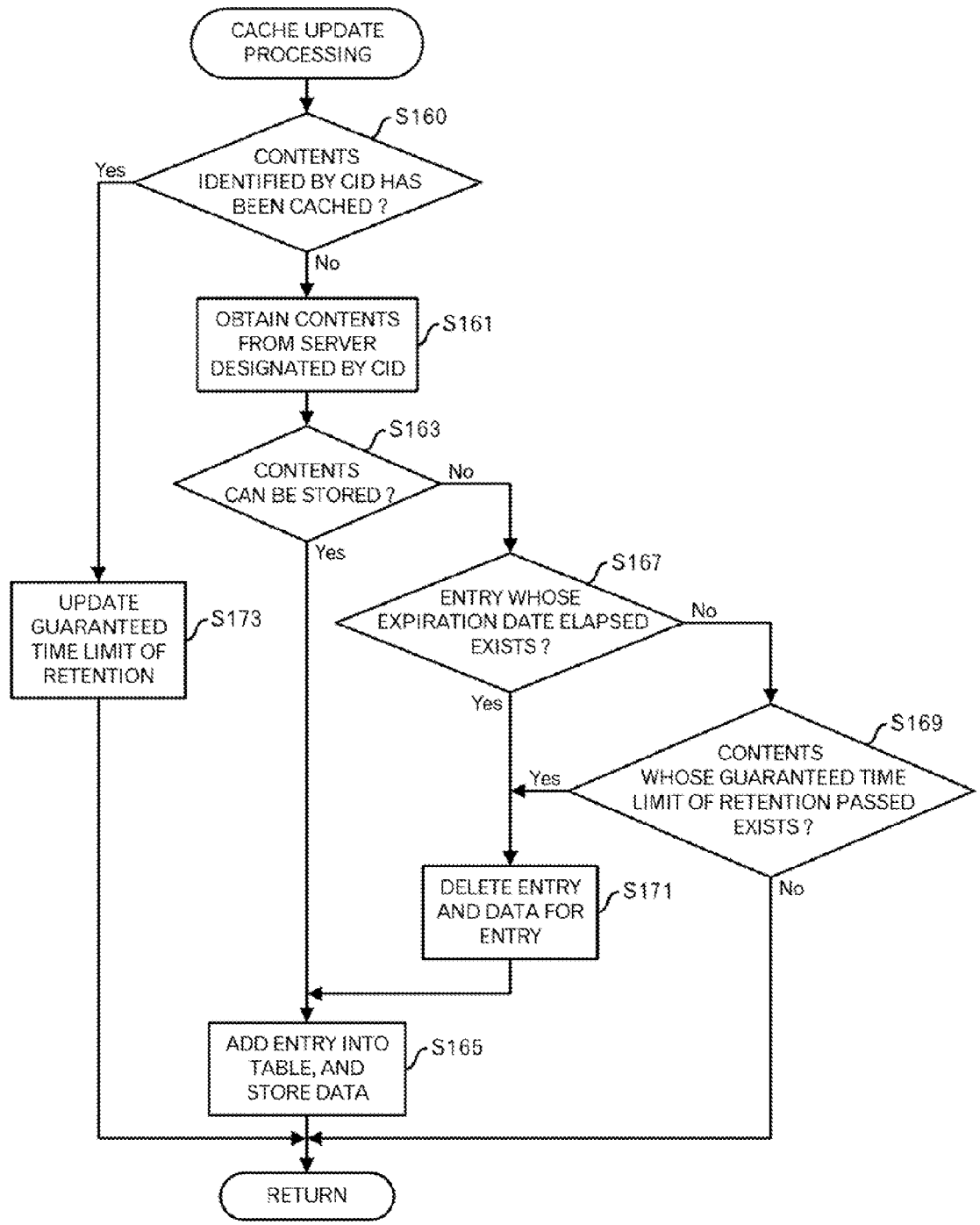
FIG. 20 is a diagram depicting a processing flow of a cache update processing.
Figures 21, 22:
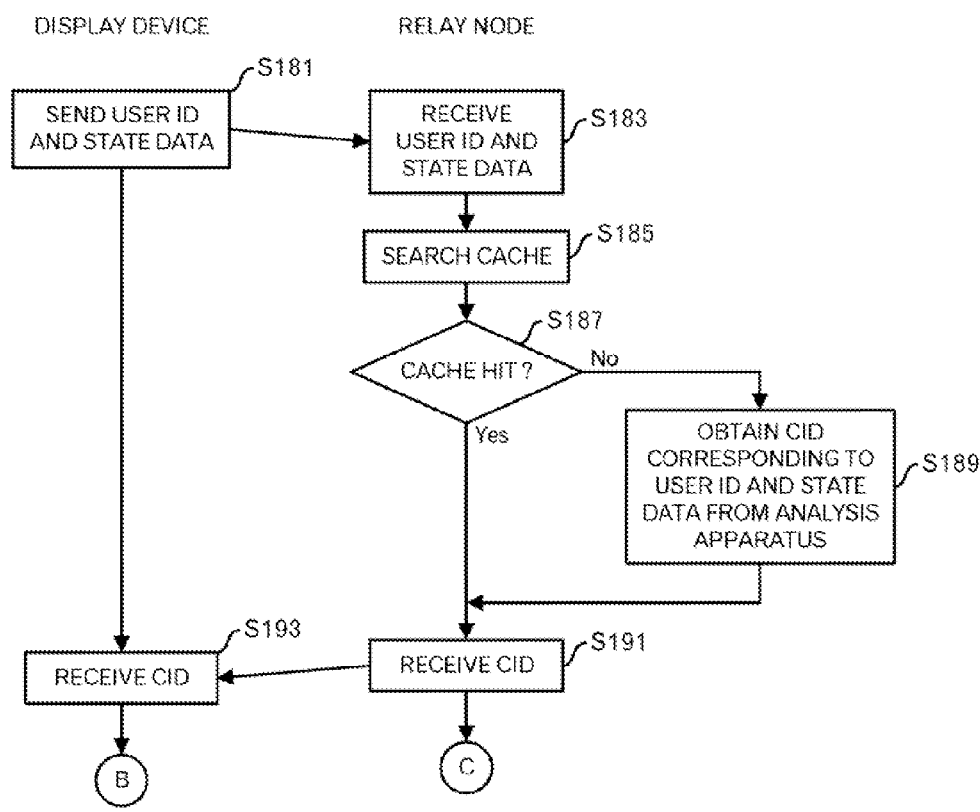
FIG. 21 is a diagram depicting an example of the cache table.
FIG. 22 is a diagram to explain a processing by the relay node and display device in the second embodiment.

First, the cache controller 2212 determines whether or not the data of the contents identified by the CID included in the definition data has been cached (FIG. 20: step S160). For example, the cache table as illustrated in FIG. 21 is stored in the cache data storage unit 2213. In other words, in an example of FIG. 21, an entry for the definition data including the user ID, the data of the output condition, the guaranteed time limit of retention and the CID and an entry for the contents-associated data including the CID, the guaranteed time limit of retention, a file name of the contents identified by the CID and contents expiration date (data obtained from the contents sever 130 or the like) are registered. Because the data of the contents stored in the cache data storage unit 2213 is registered in this cache table, it is possible to determine whether or not the data of the contents has been cached by determining whether or not the CID has been registered in the column of the ID. When the definition data for other users is processed, there is a case where the data of the same contents has been obtained. Therefore, this step is carried out. Moreover, the entry and the data of the contents, which are expired, are automatically deleted, and the entry and the data of the contents whose guaranteed time limit of retention passed are automatically deleted.

When the contents identified by the CID has been cached, the cache controller 2212 updates the guaranteed time limit of retention in a record for the contents-associated data with the guaranteed time limit of retention, which is included in the definition data, when the guaranteed time limit of retention, which is included in the entry for the contents-associated data, which includes the CID included in the definition data, is later than the guaranteed time limit of retention, which is included in the definition data (step S173). Then, the processing returns to the calling-source processing.

On the other hand, when the contents identified by the CID is not stored in the cache data storage unit 2213, the cache controller 2212 requests a server (mainly, contents server 130) addressed by the CID included in the definition data for data of the contents designated by the CID to obtain the data of the contents (step S161). Then, the cache controller 2212 determines whether or not the cache data storage unit 2213 has free capacity enough to store the obtained data of the contents (step S163). When the cache data storage unit 2213 has free capacity enough to store the obtained data of the contents, the cache controller 2212 adds an entry for the contents-associated data of the obtained contents into the table of the cache data storage unit 2213, and stores the obtained data of the contents into the cache data storage unit 2213 (step S165). Then, the processing returns to the calling-source processing.

On the other hand, when the cache data storage unit 2213 does not have free capacity enough to store the obtained data of the contents, the cache controller 2212 determines whether or not any entry whose expiration date passed, namely, any entry that the present time is later than the expiration time limit, exists in the cache table (step S167). When such an entry exists in the cache table, the cache controller 2212 deletes the entry and the data of the contents for the entry in the cache data storage unit 2213 (step S171). Then, the processing shifts to the step S165.

On the other hand, when no entry whose expiration date passed exists, the cache controller 2212 determines whether or not data of the contents for which the guaranteed time limit of retention passed (i.e. the contents relating to the entry for which the present time is later than the guaranteed time limit of retention) exists in the cache data storage unit 2213 (step S169). When the data of the contents for which the guaranteed time limit of retention passed exists in the cache data storage unit 2213, the processing shifts to the step S171. On the other hand, the data of the contents for which the guaranteed time limit of retention passed does not exist in the cache data storage unit 2213, the processing returns to the calling-source processing.

By carrying out such a processing, until the user actually comes to the place of the display devices 231 to 233, the definition data and the data of the contents associated with the definition data can be prepared in the cache data storage unit 2213.

Next, a processing executed when the user comes to the display device 231 and the user ID is read from the IC card or the like by the sensor in the display device 231 will be explained by using FIGS. 22 and 23. Incidentally, when the user ID is read, the temperature is measured by the temperature sensor or the like to generate the state data. The state data may be the temperature data itself, or the state data may be the determination result such as high temperature or low temperature. Then, the display device 231 transmits the read user ID and generated state data to the relay node 221 (FIG. 22: step S181). On the other hand, when the output processing unit 2214 of the relay node 221 receives the user ID and state data from the display device 231 (step S183), the output processing unit 2214 searches the cache table to extract the CID corresponding to the user ID and output condition that the state data satisfies (step S185). When the CID is extracted and it is determined that the cache hit occurs (step S187: Yes route), the output processing unit 2214 returns the CID to the display device 231 (step S191). The display device 231 receives the CID from the relay node 221 (step S193). Then, the processing shifts to a processing of FIG. 23 through terminals B and C.

On the other hand, when the CID is not extracted and it is determined that the cache miss occurs (step S187: No route), the output processing unit 2214 outputs the user ID and state data to the cache controller 2212. Then, the cache controller 2212 transmits the user ID and state data to the analysis apparatus 110, and obtains the CID corresponding to the user ID and state data from the analysis apparatus 110 (step S189). Then, the cache controller 2212 outputs the CID to the output processing unit 2214. The output processing unit 2214 receives the CID from the cache controller 2212. Then, the processing shifts to step S191.

Figure 23:
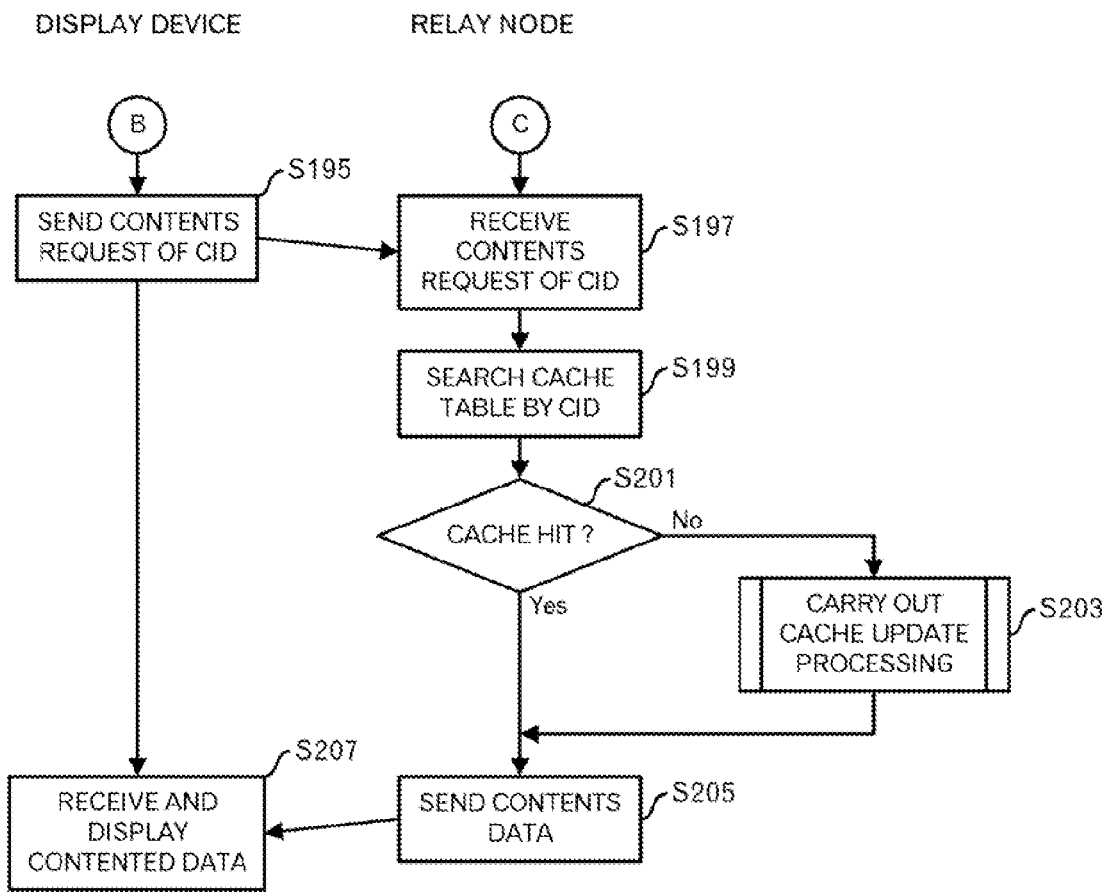
FIG. 23 is a diagram to explain a processing by the relay node and display device in the second embodiment.

Shifting to the explanation of the processing in FIG. 23, the display device 231 transmits a contents request of the received CID to the relay node 221 (step S195). The output processing unit 2214 of the relay node 221 receives the contents request of the CID from the display device 231 (step S197), and searches the cache table by the CID (step S199). When the received CID is registered in the column of the ID, in other words, the cache hit occurs (step S201: Yes route), the output processing unit 2214 reads data of the contents relating to the CID from the cache data storage unit 2213, and transmits the data of the contents to the display device 231 (step S205). On the other hand, when the received CID is not registered in the column of the ID, in other words, the cache miss occurs (step S201: No route), the output processing unit 2214 outputs a request for obtaining the data of the contents relating to the CID to the cache controller 2212, and the cache controller 2212 carries out the cache update processing (FIG. 20) in response to the request for obtaining the data of the contents (step S203). Then, the processing shifts to the step S205. However, when the data of the contents cannot be stored in the cache data storage unit 2213, the cache controller 2212 outputs the obtained data of the contents to the output processing unit 2214. Moreover, the cache controller 2212 may simply obtain the data of the contents, and outputs the data of the contents to the output processing unit 2214 without carrying out the cache update processing.

The display device 231 receives the data of the contents from the relay node 221, and displays the data on the display unit (step S207). Thus, it becomes possible for the user to display the contents.

Thus, when the data of the contents is stored in the cache data storage unit 2213, it is possible to display the contents to the user, immediately.

Embodiment 3

When the capacity of the cache data storage unit 2213 is large, the data of the contents can be stored regardless of considering the free capacity. However, there is a case where the free capacity is deficient. Then, in this embodiment, when a data amount of the contents is less than a predetermined amount (i.e. an amount of data determined so that the time required until the data of the contents is displayed on the display device 231 is within a predetermined time), the data of the contents is obtained each time from the contents server 130 to output the data of the contents to the display device 231. More specifically, in the cache update processing, the request of the contents relating to the CID may be transmitted to the contents server 130 once, and it may be determined whether or not the data of the contents is stored in the cache data storage unit 2213 from size data of the contents included in a header (e.g. Content-Size column included in the header portion in case of the Hyper Text Transfer Protocol (HTTP)) in a packet or the like for the data of the contents transmitted from the contents server 130. Incidentally, not only an amount of data but also the time required to obtain the data of the contents may be measured, and it may be determined based on the time.

Embodiment 4

In the second embodiment, the delivery destination node of the definition data is identified based on the node disposition table 122 as illustrated in FIG. 10. However, the display device actually used by the user may be biased among the display devices 231 to 233 disposed within the station A. When the node is biased, it is efficient that the definition data is delivered only to the relay node connected to the display device, which is frequently used by the user, and the data of the contents is cached.

Therefore, for example, in the relay node, a log including the user ID and node ID of the relay node connected to the display device that read the user ID is stored, and the logs are uploaded to the analysis apparatus 110 every predetermined period. Then, the analysis apparatus 110 identifies the relay node connected to the display device that the user frequently uses and LocationID of the station where the relay node is disposed, and transmits a combination of the user ID, the LocationID and node ID to the control apparatus 120. When the control apparatus 120 receives such data from the analysis apparatus 110, the control apparatus 120 stores the received data into the cache delivery destination table, and narrows the delivery destination nodes of the definition data.

Figure 24:
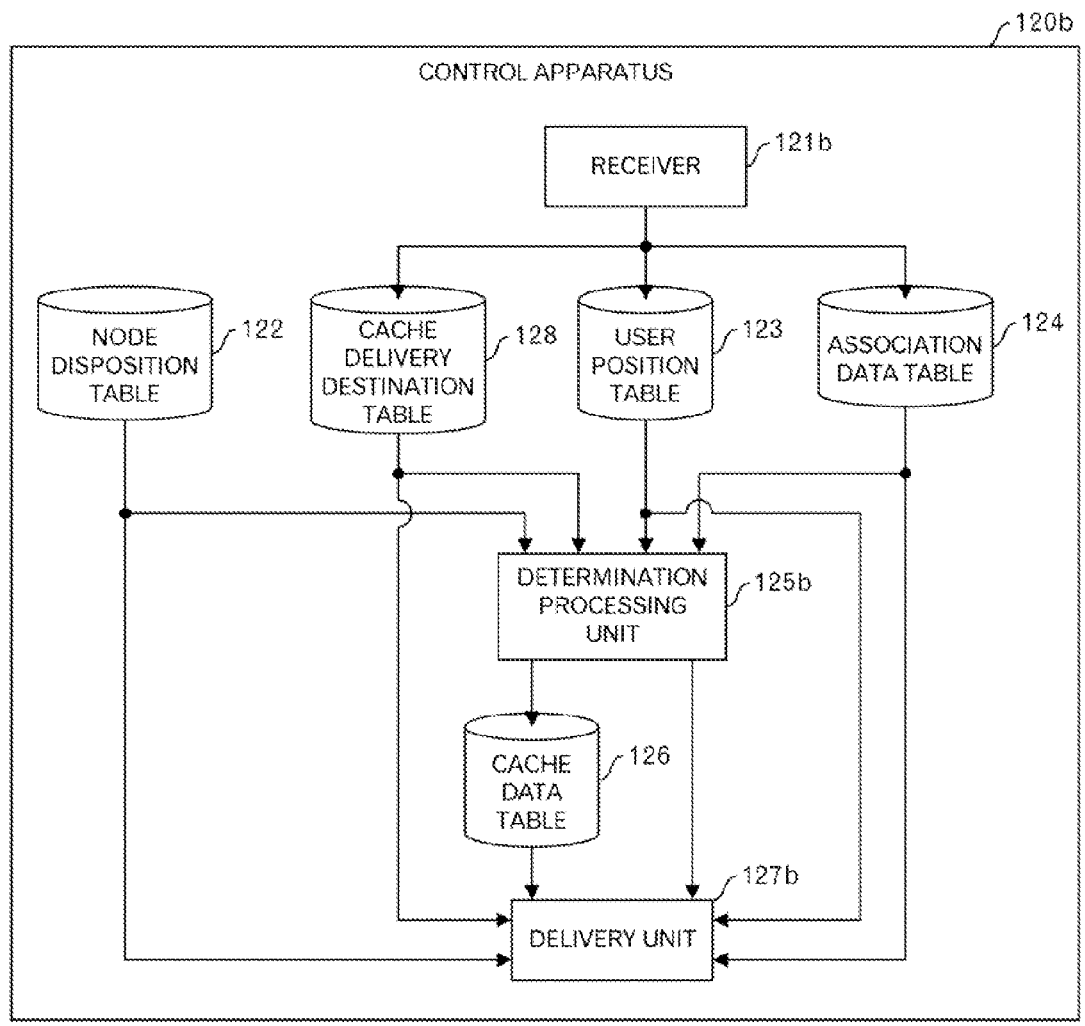
FIG. 24 is a functional block diagram of a control apparatus relating to a fourth embodiment.

FIG. 24 illustrates a functional block diagram of a control apparatus 120b relating to this embodiment. The control apparatus 120b has a receiver 121b, node disposition table 122, user position table 123, association data table 124, determination processing unit 125b, cache data table 126, delivery unit 127b and cache delivery destination table 128.

The receiver 121b receives data of the analysis apparatus 110, and stores the data into user position table 123, association data table 124 or cache delivery destination table 128. The user position table 123 is a table storing position data of each user. The association data table 124 is a table storing association data including the user ID, output condition and contents ID. The cache delivery destination table 128 is a table storing the node ID of the relay node in association with the user ID and LocationID. The determination processing unit 125b correlates the node ID of the relay node and ID of the contents to be cached in the relay node from the node disposition table 122, user position table 123, association data table 124 and cache delivery destination table 128, and stores the correlation data into the cache data table 126. The delivery unit 127b generates definition data including the association data from the node disposition table 122, cache delivery destination table 128, user position table 123 and association data table 124, identifies the delivery destination node of the definition data, and transmits the definition data to the delivery destination node.

Figures 25, 26:
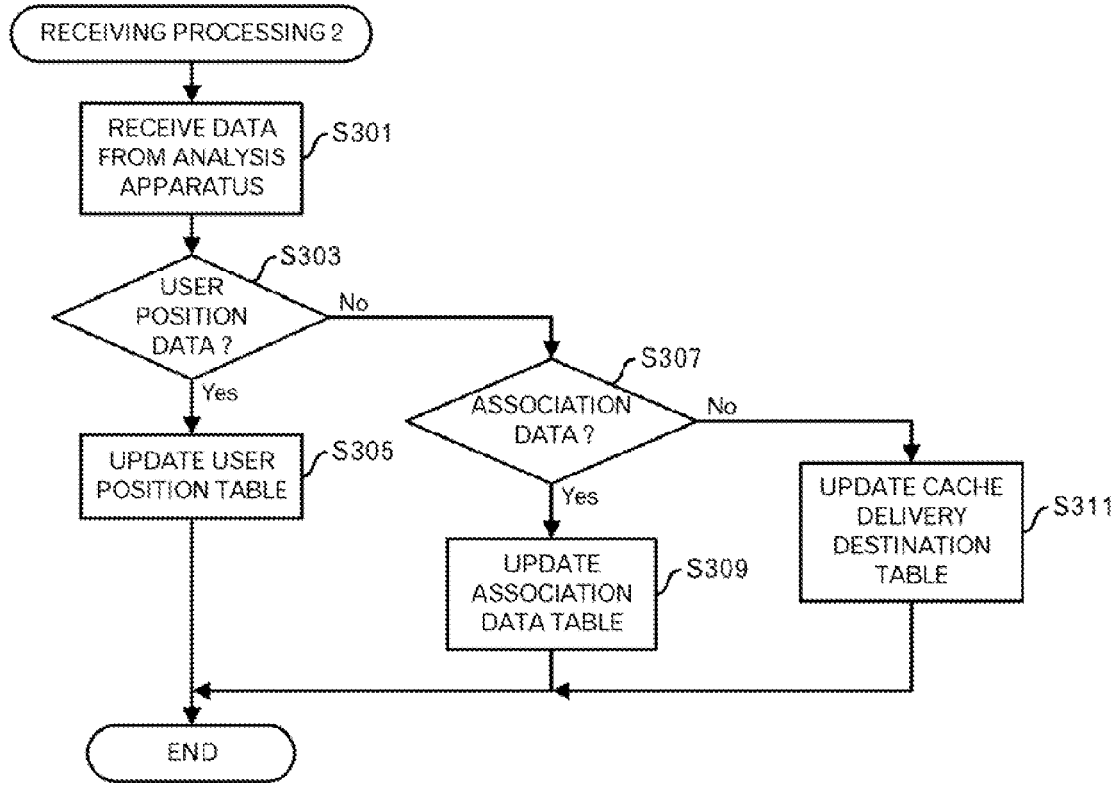
FIG. 25 is a diagram depicting a processing flow of a receiving processing in the fourth embodiment.
FIG. 26 is a diagram depicting an example of a cache delivery destination table.

Next, processing contents of the control apparatus 120b will be explained by using FIGS. 25 to 28. First, FIG. 25 illustrates a processing flow of a processing by the receiver 121b in the control apparatus 120b. Before this processing, the automatic gate machine 210 reads the user ID from the IC card or the like that the user has, and transmits the user ID and LocationID to the analysis apparatus 110. The analysis apparatus 110 reads data of the CID and data of the output condition, which correspond to the received user ID, from the DB 111, and transmits the user ID and LocationID and the user ID, CID and data of the output condition to the control apparatus 120b. Furthermore, the analysis apparatus 110 reads the node ID associated with the combination of the user ID and LocationID from the DB 111, and transmits the node ID to the control apparatus 120b. However, there is a case where the node ID associated with the combination of the user ID and LocationID does not exist, and in such a case, such data is not transmitted.

Then, when the receiver 121b of the control apparatus 120b receives data from the analysis apparatus 110 (FIG. 25: step S301), the receiver 121b determines whether or not the data is the user position data (step S303). In this embodiment, the user position data including the user ID and LocationID, association data including the user ID, CID and data of the output condition, and node designation data including the user ID, LocationID and node ID are transmitted from the analysis apparatus 110. When the received data is the user position data, the receiver 121b correlates the received LocationID with the received user ID and registers the correlation data in the user position table 123, and also registers the present time as the latest update time (step S305). When the received user ID has already been registered, the entry of the user ID is updated with the received LocationID and the present time.

On the other hand, when the received data is not the user position data, the receiver 121b determines whether or not the received data is the association data (step S307). When the received data is the association data, the receiver 121b updates the association data table 124 with the user ID, CID and data of the output condition (step S309). For example, the user ID, CID and data of the output condition are additionally registered. However, when the record for the received user ID has already been registered, the overwrite may be carried out.

On the other hand, when the received data is not the association data, the received data is the node designation data. Therefore, the receiver 121b registers the node ID in association with the combination of the user ID and LocationID in the cache delivery destination table 128 (step S311). For example, when the node ID has already been registered for the same combination of the user ID and LocationID, the overwrite is carried out, and when the node ID has not been registered for the combination of the user ID and LocationID, the additional registration is carried out.

The cache delivery destination table 128 is a table as illustrated in FIG. 26, for example. In an example of FIG. 26, the node ID is registered in association with the user ID and LocationID.

Figure 27:
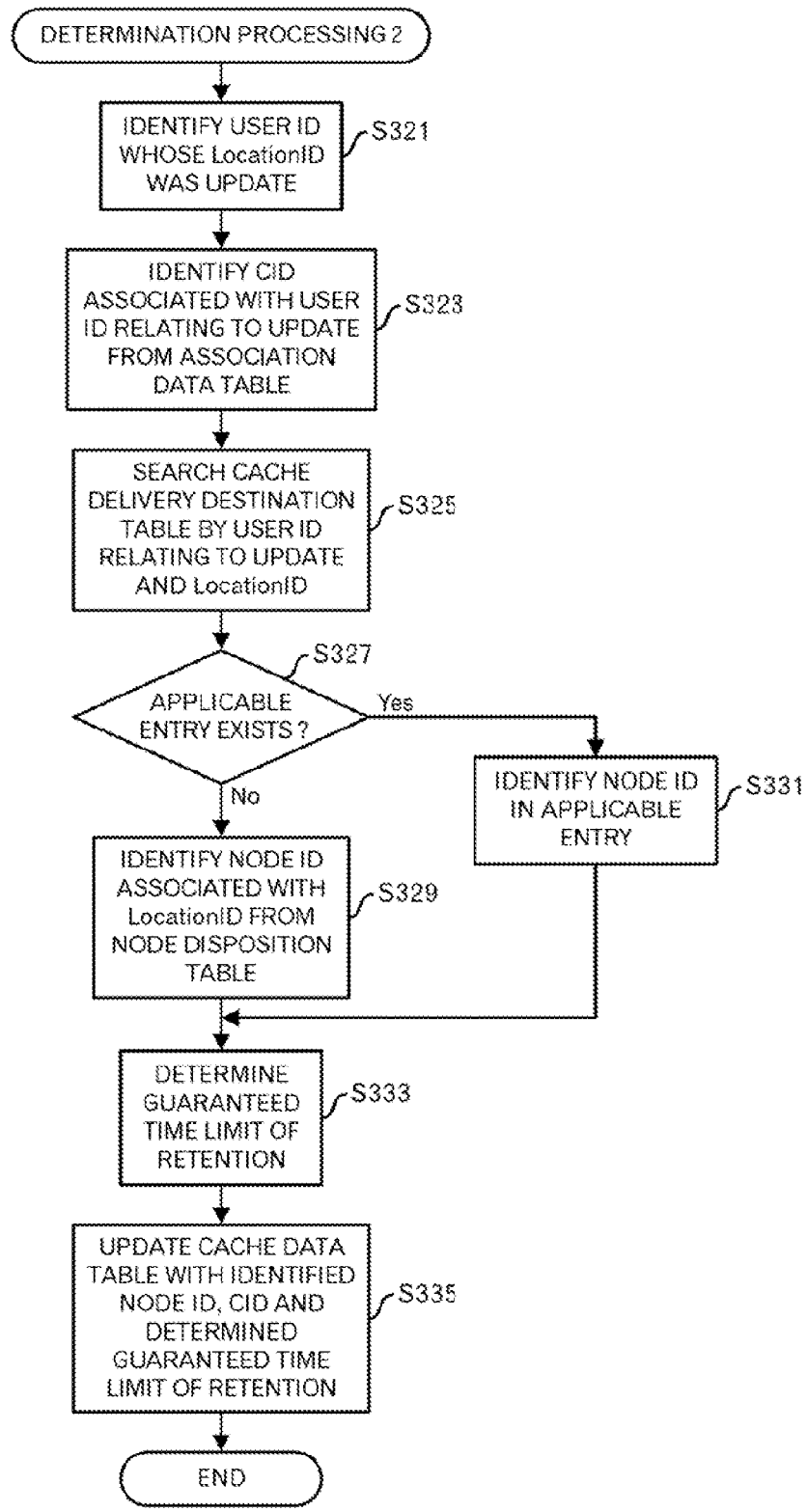
FIG. 27 is a diagram depicting a processing flow of a determination processing in the fourth embodiment.

Next, a processing of the determination processing unit 125b in the control apparatus 120b is explained by using FIG. 27. The determination processing unit 125b identifies the user ID whose LocationID is updated in the user position table 123 (FIG. 27: step S321). In addition, the determination processing unit 125b identifies the CID associated with the user ID relating to the update from the association data table 124 (step S323). Then, the determination processing unit 125b searches the cache delivery destination table 128 by the user ID and LocationID, which relate to the update (step S325), and determines whether or not an applicable entry exists in the cache delivery destination table 128 (step S327). When there is no applicable entry, the determination processing unit 125b identifies the node IDs associated with the LocationID from the node disposition table 122 (step S329). Then, the processing shifts to step S333. On the other hand, when there is an applicable entry, the determination processing unit 125b identifies the node ID in the applicable entry (step S331). Then, the processing shifts to the step S333.

Then, the determination processing unit 125b determines the time after a predetermined time (e.g. one hour) since the present time, for example, as the guaranteed time limit of retention for the contents in the relay node (step S333). This step is the same as the step S117. After that, the determination processing unit 125b updates the cache data table 126 with the identified node ID, CID and guaranteed time limit of retention (step S335).

Figure 28:
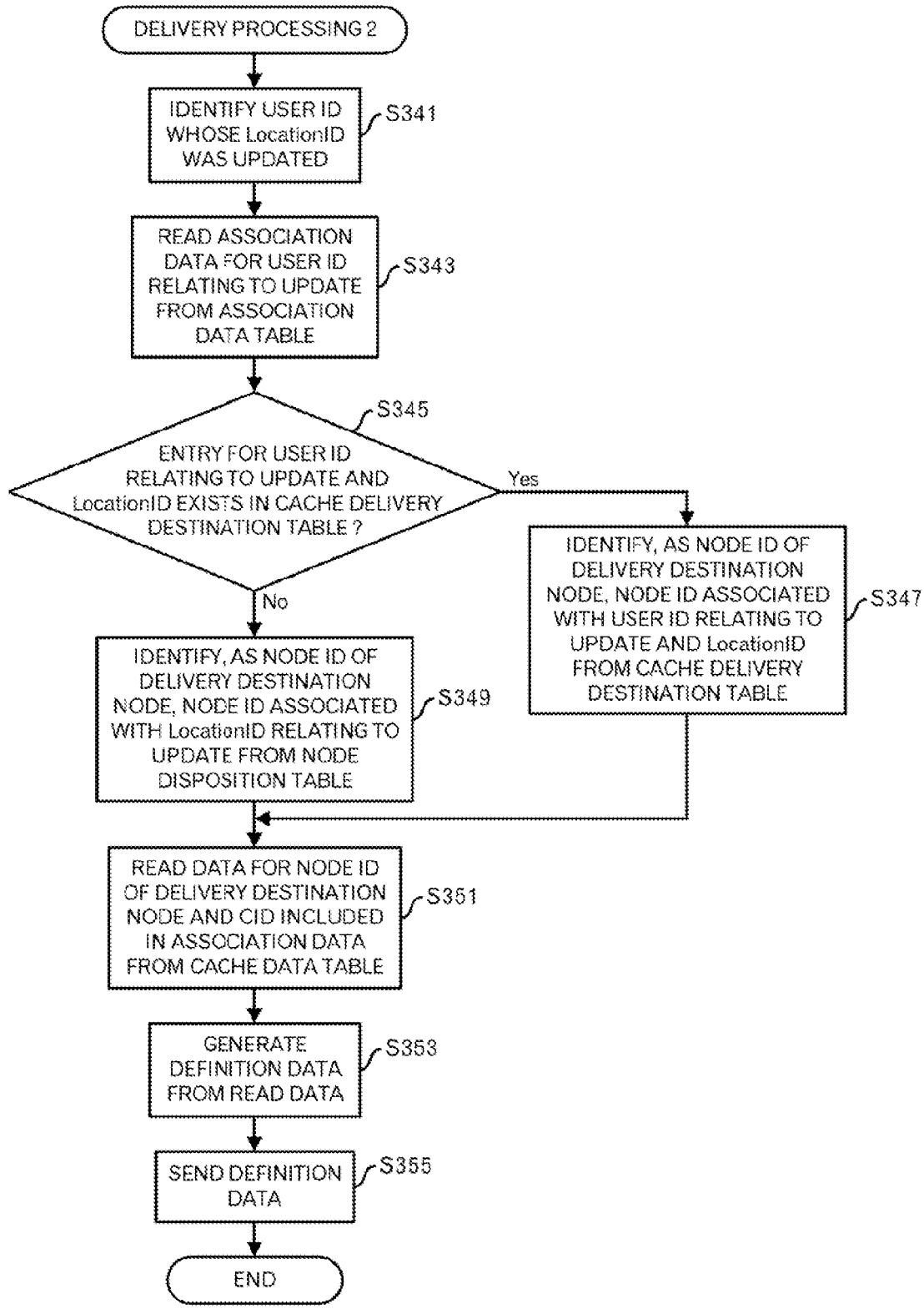
FIG. 28 is a diagram depicting a processing flow of a delivery processing in the fourth embodiment.

Next, a processing by the delivery unit 127b in the control apparatus 120b is explained by using FIG. 28. The delivery unit 127b identifies the user ID whose LocationID was updated in the user position table 123 (FIG. 28: step S341). Incidentally, the user ID whose LocationID was updated may be notified from the determination processing unit 125b. Then, the delivery unit 127b reads the association data for the user ID relating to the update, from the association data table 124 (step S343). Namely, the CID and data of the output condition, which are associated with the identified user ID, are read out.

Then, the delivery unit 127b determines whether or not an entry for the user ID and LocationID, which relate to the update, exists in the cache delivery destination table 128 (step S345). When there is an entry for the user ID and LocationID, which relate to the update, the delivery unit 127b identifies the node ID associated with the user ID and LocationID, which relate to the update, from the cache delivery destination table 128, as the node ID of the delivery destination node (step S347). The processing shifts to the step S351. On the other hand, when there is no applicable entry, the delivery unit 127b identifies the node IDs associated with the LocationID relating to the update from the node disposition table 122 as the node ID of the delivery destination node (step S349).

Then, the delivery unit 127b reads data for the node ID of the delivery destination node and CID included in the read association data from the cache data table 126 (step S351). Then, the delivery unit 127b generates the definition data from the data read at the step S343 or S351 (step S353), and transmits the definition data to the delivery destination node identified at the step S347 or S349 (step S355).

Thus, when the applicable entry exists in the cache delivery destination table 128, the delivery destination node of the definition data is limited, and the number of relay nodes that cache the data of the contents based on the definition data becomes lesser. Namely, it becomes possible to reduce the communication load on the network 300, and efficiently utilize the storage capacity of the cache data storage unit 2213 in the relay node to which the definition data is not delivered.

Embodiment 5

In the second embodiment, in FIGS. 22 and 23, the display device 231 obtains the data of the contents by transmitting requests twice to the relay node 221. However, as described below, a configuration may be adopted in which the display device 231 transmits a request to the relay node 221 only once and obtains the data of the contents.

Figure 29:
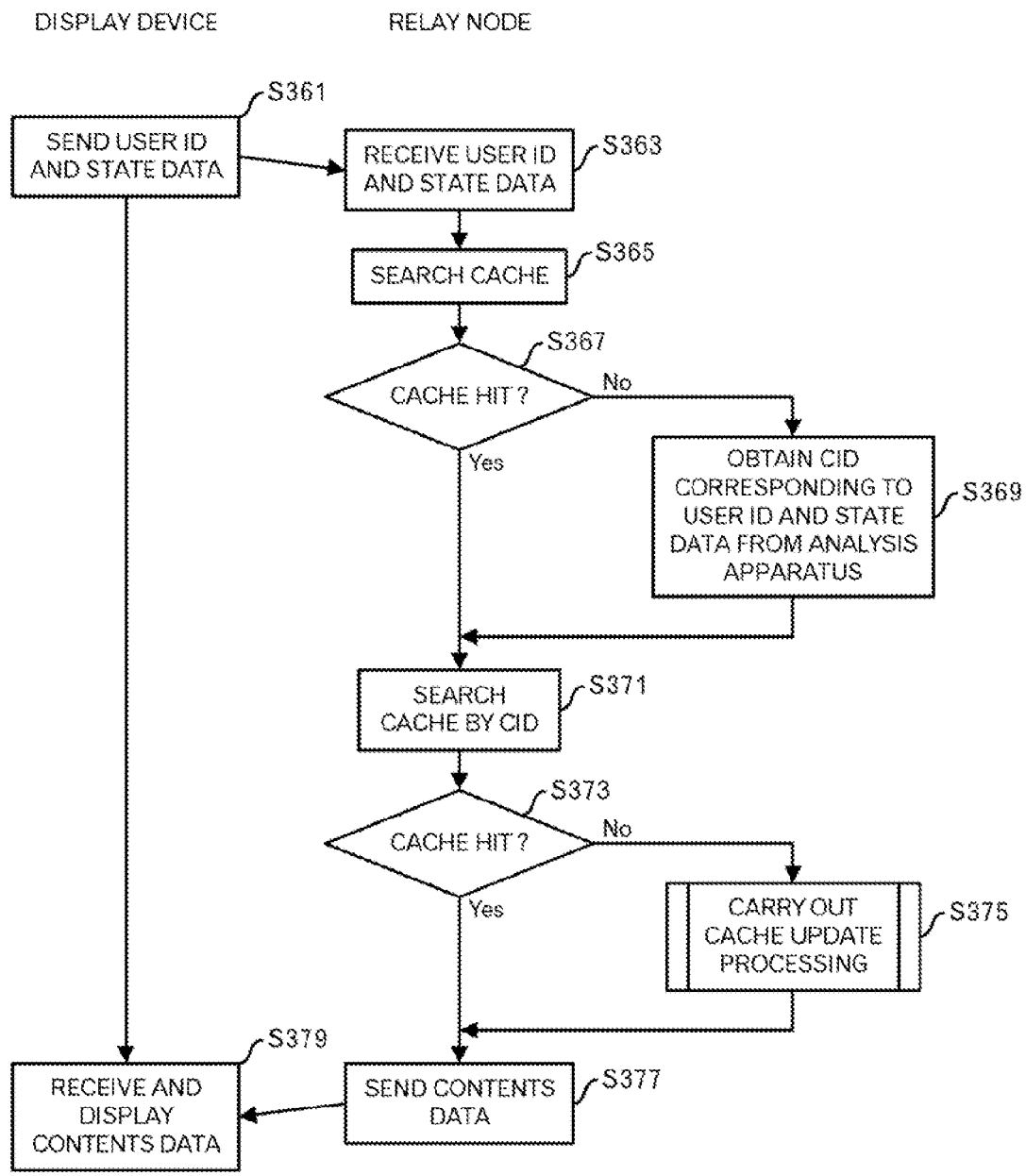
FIG. 29 is a diagram depicting a processing flow of a processing by the relay node and display device in a fifth embodiment.

More specifically, the display device 231 transmits the read user ID and generated state data to the relay node 221 (FIG. 29: step S361). On the other hand, when the output processing unit 2214 of the relay node 221 receives the user ID and state data from the display device 231 (step S363), the output processing unit 2214 searches the cache table for the CID associated with the user ID and output condition that the state data satisfies (step S365). When the CID cannot be found, in other words, the cache miss occurs (step S367: No route), the output processing unit 2214 outputs the user ID and state data to the cache controller 2212. Then, the cache controller 2212 transmits the user ID and state data to the analysis apparatus 110, and obtains the CID corresponding to the user ID and state data from the analysis apparatus 110 (step S369). The cache controller 2212 outputs the CID to the output processing unit 2214. The output processing unit 2214 receives the CID from the cache controller 2212. Then, the processing shifts to the step S371. On the other hand, even when the CID is found, in other words, the cache hit occurs (step S367: Yes route), the processing shifts to the step S371.

The output processing unit 2214 searches the cache table by the received CID (step S371). When the received CID has been registered in the column of the ID, in other words, the cache hit occurs (step S373: Yes route), the output processing unit 2214 reads the data of the contents relating to the CID from the cache data storage unit 2213, and transmits the data of the contents to the display device 231 (step S377). On the other hand, when the received CID has not been registered in the column of the ID, in other words, the cache miss occurs (step S373: No route), the output processing unit 2214 outputs a request for obtaining the data of the contents relating to the CID to the cache controller 2212, and the cache controller 2212 carries out the cache update processing (FIG. 20) in response to the request (step S375). Then, the processing shifts to step S377. However, when the data of the contents cannot be stored in the cache data storage unit 2213, the cache controller 2212 outputs the obtained data of the contents to the output processing unit 2214. In addition, the cache controller 2212 simply obtains the data of the contents and outputs the obtained data of the contents to the output processing unit 2214 without carrying out the cache update processing.

The display device 231 receives the data of the contents from the relay node 221, and displays the received data on the display unit (step S379). Thus, it is possible to display the contents to the user.

In addition, it is possible to shorten the time up to the display of the contents.

Embodiment 6

Because there is a limit of the capacity of the cache data storage unit 2213 in each of the relay node 221 and 222, the data of the contents associated with the definition data may not be stored in the cache data storage unit 2213 even when the definition data is received from the control apparatus 120. When such a problem occurs, it is impossible to shorten the time required for the display of the contents. Then, in this embodiment, an upper-level relay node of the relay nodes 221 and 222 provided in the station A, for example, is provided, and the upper-level relay node holds the data of the contents, which cannot be cached in the relay nodes 221 and 222. Instead of every station, the upper-level relay node may be provided every some stations.

Figures 30, 31:
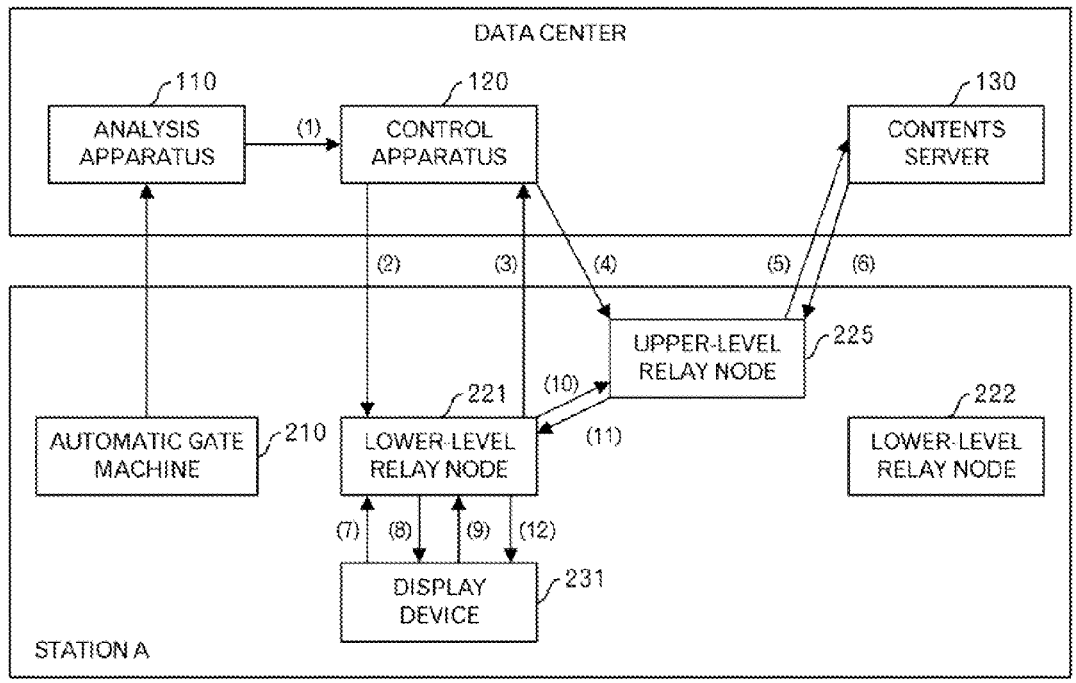
FIG. 30 is a diagram to explain a processing in a sixth embodiment.
FIG. 31 is a diagram depicting an example of a node disposition table in the sixth embodiment.

FIG. 30 illustrates a processing flow of the entire system. In an example of FIG. 30, the upper-level relay node 225 is newly introduced in the station A. The relay nodes 221 and 222 in the second embodiment correspond to lower-level relay nodes 221 and 222.

When the user puts the IC card or the like on the automatic gate machine 210, the automatic gate machine 210 transmits the user ID and LocationID to the analysis apparatus 110. The analysis apparatus 110 reads the CID and data of the output condition, which are associated with the user ID, from the DB 111, and outputs the CID and data of the output condition with the combination of the user ID and LocationID to the control apparatus 120 (FIG. 30: step (1)). When the receiver 121 of the control apparatus 120 receives the combination of the user ID, the CID and data of the output condition, and the combination of the user ID and LocationID, the receiver 121 stores the first combination into the association data table 124 and the second combination into the user position table 123. After that, the determination processing unit 125 and delivery unit 127 carry out the processing, and the delivery unit 127 generates the aforementioned definition data, and transmits the generated definition data to the delivery destination node (step (2)). The processing up to this step is the same as that in the second embodiment.

On the other hand, the cache controller 2212 in the lower-level relay node 221 carries out a cache update processing (FIG. 20). When the data of the contents associated with the definition data can be stored in the cache data storage unit 2213, a following processing is not carried out. However, there is a case where the data of the contents cannot be stored in the cache data storage unit 2213, because the capacity is deficient. In such a case, the cache controller 2212 (or receiver 2211) replies to the control apparatus 120 with a cache refusal notification including, for example, the CID (step (3)). The cache refusal notification may include the definition data.

When the delivery unit 127 receives the cache refusal notification including the CID, for example, from the lower-level relay node 221, the delivery unit 127 identifies the upper-level relay node 225 of the lower-level relay node 221 from the node disposition table 122, and transmits a cache request including the CID (step (4)). In this embodiment, the node disposition table 122 is a table as illustrated in FIG. 31, for example. In an example of FIG. 31, the node ID of the upper-level relay node is registered in association with the node ID of the lower-level relay node and LocationID. By using this data, the node ID of the upper-level relay node is identified from the node ID of the lower-level relay node 221 of the transmission source.

When the upper-level relay node 225 receives the cache request including the CID from the control apparatus 120, the upper-level relay node 225 requests the contents server 130, for example, to send the data of the contents relating to the CID according to the CID (step (5)), and obtains the data of the contents from the contents server 130 (step (6)). The upper-level relay node 225 stores the obtained data of the contents into the data storage unit.

After that, when the user comes to a place at which the display device 231 is provided, and causes the sensor to read the IC card or the like, the display device 231 outputs the user ID and state data to the lower-level relay node 221 (step (7)). On the other hand, the output processing unit 2214 of the lower-level relay node 221 receives the user ID and state data from the display device 231. Then, the output processing unit 2214 identifies the CID associated with the user ID and data of the output condition that the state data satisfies in the cache table stored in the cache data storage unit 2213, and replies to the display device 231 with the CID (step (8)). The display device 231 outputs the content request of the received CID to the lower-level relay node 221 (step (9)). When the output processing unit 2214 of the lower-level relay node 221 receives the contents request including the CID, the output processing unit 2214 confirms whether or not the data of the contents relating to the CID is stored in the cache data storage unit 2213. Here, when the data of the contents is not stored, the output processing unit 2214 outputs a request for obtaining the contents, which includes the CID, to the cache controller 2212. The cache controller 2212 transmits the contents request to a server (e.g. contents server 130) identified by the CID in the second embodiment. However, in this embodiment, the cache controller 2212 transmits the contents request including the CID to the upper-level relay node 225 (Step (10)). When the upper-level relay node 225 receives the contents request from the lower-level relay node 221, the upper-level relay node 225 reads the data of the contents relating to the CID from the data storage unit, and transmits the read data of the contents to the lower-level relay node 221 (step (11)).

When the cache controller 2212 of the lower-level relay node 221 receives the data of the contents from the upper-level relay node 225, the cache controller 2212 outputs the data to the output processing unit 2214. The output processing unit 2214 outputs the received data of the contents to the display device 231 (step (12)). The display device 231 displays the received data of the contents from the lower-level relay node 221 on the display unit.

Thus, by introducing the upper-level relay node, even when the lower-level relay node cannot cache, but the upper-level relay node can cache, the data of the contents can be outputted to the display devices 231 to 233 immediately, compared with a case where the data is obtained from the contents server 130 or the like every time.

Embodiment 7

In the second embodiment, when the user arrives at a certain station, all of the relay nodes for the certain station cache the data of the contents from the contents server 130 or the like according to the definition data. However, when a certain relay node in the certain station has already obtained the data of the contents from the contents server 130, and other relay nodes for the certain station obtain the data of the contents from the certain relay node that has already obtained the data of the contents, it is possible to reduce the processing loads of the contents server 130 and further reduce the communication loads of the communication path with the contents server 130. Therefore, in this embodiment, a following processing is carried out.

Figure 32:
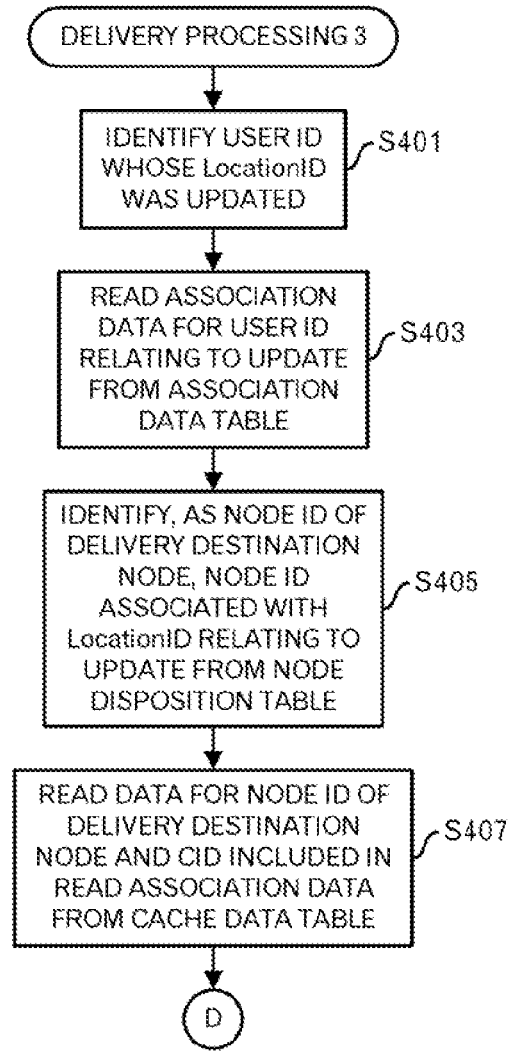
FIG. 32 is a diagram depicting a processing flow of a delivery processing in a seventh embodiment.
Figure 33:
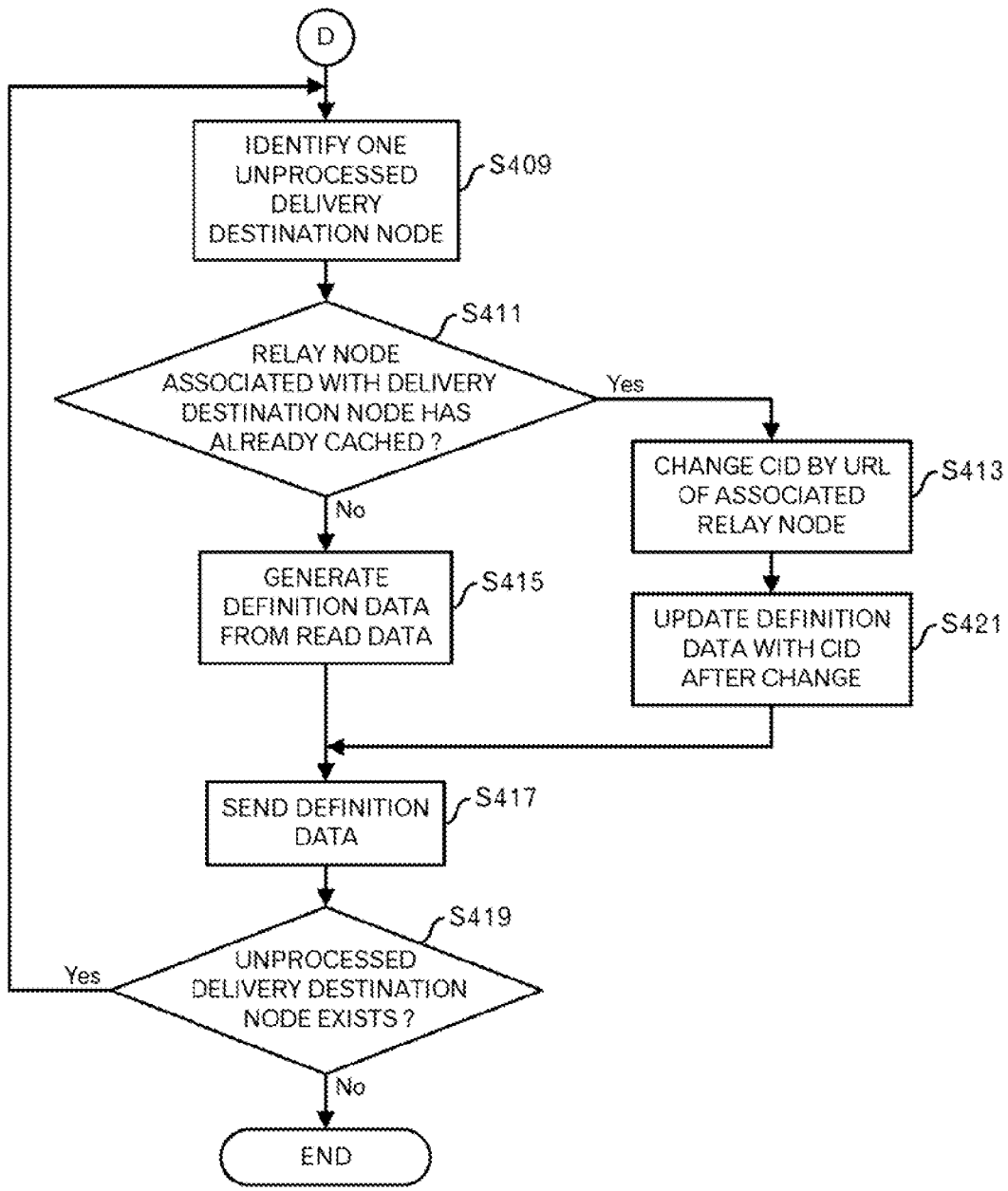
FIG. 33 is a diagram depicting a processing flow of the delivery processing in the seventh embodiment.

More specifically, the delivery unit 217 carries out a processing as illustrated in FIGS. 32 and 33. The delivery unit 127 identifies the user ID whose LocationID was updated in the user position table 123 (FIG. 32: step S401). Incidentally, the user ID whose LocationID was updated may be notified from the determination processing unit 125. Then, the delivery unit 127 reads the association data for the user ID relating to the update from the association data table (step S403). In other words, the CID and data of the output condition, which are associated with the identified user ID, are read out. Then, the delivery unit 127 identifies the node IDs associated with the LocationID relating to the update from the node disposition table 122 as the node ID of the delivery destination node (step S405). After that, the delivery unit 127 reads data for the CID included in the read association data and the node IDs of the delivery destination nodes from the cache data table 126 (step S407). Then, the processing shifts to a processing of FIG. 33 through a terminal D.

Shifting to the explanation of the processing of FIG. 33, the delivery unit 127 identifies one unprocessed node ID of the delivery destination node among the node IDs of the delivery destination nodes, which were identified at step S405 (step S409). Then, the delivery unit 127 determines whether or not the relay node associated with the identified delivery destination node has cached the contents whose CID is included in the association data read at the step S403 (step S411). More specifically, the delivery unit 127 determines whether or not the CID included in the association data is registered in the cache data table 126 in association with the node ID of the delivery node other than the delivery destination node identified at the step S409 among the delivery destination nodes identified at the step S405. For example, it is determined whether or not the CID "X" included in the association data is registered in association with the node ID "A2" of the relay node other than the delivery destination node "A1" identified at the step S409 among the delivery destination nodes A1 and A2 identified at the step S405. When plural CIDs are identified, it is determined for each CID.

When the relay node associated with the identified delivery destination node has not cached the contents whose CID is included in the association data, the delivery unit 127 generates the definition data from the data read at the steps S403 and S407 (step S415), and transmits the definition data to the delivery destination node identified at the step S409 (step S417).

On the other hand, when the relay node associated with the identified delivery destination node has already cached the contents whose CID is included in the association data, the delivery unit 127 changes the CID included in the association data by using URL or the like of the relay node associated with the identified delivery destination node (step S413). As described above, when the CID is represented by the URL, for example, the CID includes a domain name, directory name and file name of the contents server 130 before this change. At this step, the domain name and directory name of the contents server 130 are replaced with the domain name and a predetermined directory name of the relay node associated with the identified delivery destination node. Then, the delivery unit 127 updates the CID in the definition data generated at the step S415 with the changed CID (step S421). Then, the processing shifts to the step S417.

Then, the delivery unit 127 determines whether or not there is an unprocessed delivery destination node (step S419), and when there is an unprocessed delivery destination node, the processing returns to the step S409. On the other hand, when there is no unprocessed delivery destination node, the processing ends.

When carrying out the aforementioned processing, the cache controller 2212 of the relay node 221 carries out the processing similar to that of the second embodiment. In other words, the source of the contents is the contents server 130 for one relay node, but the source of the contents for the other relay nodes is the relay node that has firstly obtained the data of the contents from the contents server 130. When the cache controller 2212 of one relay node receives a request of the data of the contents from the other relay nodes, the cache controller 2212 reads out the data of the contents being requested, from the cache data storage unit 2213, and transmits the read data of the contents to the relay node of the requesting source.

Incidentally, the distance between the relay nodes is short when the relay nodes are nodes for the same station. Therefore, the relay node that received the definition data including the associated relay node as the source of the contents may obtain the contents from the associated relay node in response to receipt of a request from the connected display device without caching the contents. Even when such a processing is carried out, it may be possible to output the contents very fast.

Moreover, in the aforementioned example, the CID is represented by the URL. However, when the CID does not include the source of the contents, the address of the associated relay node may be added to the CID.

Embodiment 8

Because the capacity of the cache data storage unit of the relay node is limited, it is preferable that the utilization efficiency is improved by deleting data apparently unnecessary data at the early stage.

For example, a case is considered where a user enters into the station A at the automatic gate machine of the station A, gets on a train to move to a station B, passes through an automatic gate machine in the station B, gets on another train to move to a station C, passes through an automatic gate machine in the station C, and goes out of the station C.

In such a case, the transitions from the station A to the station B, from the station B to the station C, from the station C to "position unknown" are detected. When the movement from the station A to the station B can be detected, the cached data for that user in the station A is unnecessary. When the movement from the station B to the station C can be detected, the cached data for that user in the station B is unnecessary. Furthermore, when the transition from the station C to "position unknown" is detected, the cached data for that user in the station C is unnecessary. When unnecessary cached data is deleted according to the movement and transition to the "position unknown", the utilization efficiency of the cache data storage unit is improved. Then, a processing as described below is carried out.

Incidentally, the LocationID that is outputted by the sensor is distinguished between that outputted by the automatic gate machine for the entrance of the station and that outputted by the automatic gate machine for the exit of the station. For example, when the user enters into the station A, StationA_in is outputted instead of StationA, and when the user exits from the station A, StationA_out is outputted.

First, FIG. 34 illustrates a processing flow of a processing by the receiver 121 in the control apparatus 120. As an assumption, the automatic gate machine 210 reads the user ID from the IC card or the like that the user has, and transmits the user ID and the LocationID to the analysis apparatus 110. The analysis apparatus 110 reads the CID and data of the output condition, which are associated with the received user ID, from the DB 111, and transmits the user ID and LocationID, and user ID, CID and data of the output condition to the control apparatus 120.

Then, when the receiver 121 of the control apparatus 120 receives data from the analysis apparatus 110 (FIG. 34: step S431), the receiver 121 determines whether or not the received data is the user position data (step S433). In this embodiment, the analysis apparatus 110 transmits the user position data including the user ID and LocationID, and association data including the user ID, CID and data of the output condition. When the received data is the user position data, the receiver 121 determines whether or not the received LocationID represents the user goes out of the area (e.g. StationA_out in the aforementioned example) (step S435). When the received LocationID represents that the user goes out of the area, the receiver 121 registers the LocationID, which is registered as the present LocationID, as old LocationID in association with the received user ID, registers the present time as the latest update time, and further registers "position unknown" as the present LocationID instead of the received LocationID (step S439). For example, data as illustrated in FIG. 35 is registered in the user position table 123. In an example of FIG. 35, the present LocationID representing the present location, the latest update time, old LocationID representing the immediately previous location are registered.

On the other hand, when the received LocationID does not represent the user goes out of the area, the receiver 121 registers the LocationID, which is registered as the present LocationID, as the old LocationID in association with the received user ID, registers the present time as the latest update time, and further registers the received LocationID as the present LocationID (step S437).

On the other hand, when the received data is not the user position data, the receiver 121 updates the association data table 124 with the user ID, CID and data of the output condition (step S441). For example, the user ID, CID and data of the output condition are additionally registered in the association data table 124. However, in this embodiment, the present time is additionally registered as the latest update time in order to easily understand new and old entry. For example, data as illustrated in FIG. 36 is registered in the association data table 124. In an example of FIG. 36, the user ID, CID, data of the output condition and latest update time are correlated and stored.

Figure 37:
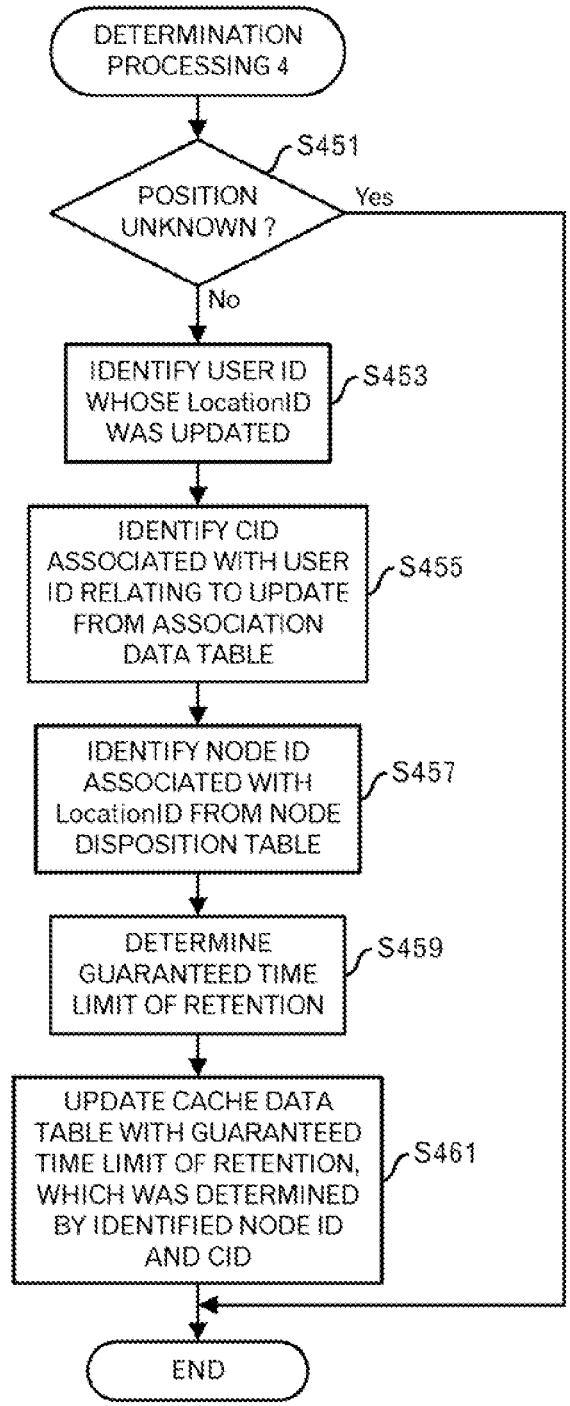
FIG. 37 is a diagram depicting a processing flow of a determination processing in the eighth embodiment.

Next, processing contents of the determination processing unit 125 is explained by using FIG. 37. The determination processing unit 125 determines whether or not the LocationID relating to the update represents "position unknown" in the user position table 123 (FIG. 37: step S451). When the LocationID relating to the update represents "position unknown", the processing ends. When the LocationID represents "position unknown", it is impossible to identify to which relay node the data of the contents should be cached. On the other hand, when the LocationID relating to the update does not represent "position unknown", the determination processing unit 125 identifies the user ID whose LocationID was updated in the user position table 123 (step S453). Then, the determination processing unit 125 identifies the CID associated with the user ID relating to the update from the association data table 124 (step S455). In addition, the determination processing unit 125 identifies the node ID associated with the LocationID from the node disposition table 122 (step S457).

Moreover, the determination processing unit 125 determines a value after a predetermined time (e.g. 1 hour) since the present time as the guaranteed time limit of retention of the contents in the relay node (step S459). After that, the determination processing unit 125 updates the cache data table 126 with the identified node ID, CID and guaranteed time limit of retention (step S461). For example, data as illustrated in FIG. 16 is stored in the cache data table 126.

Figure 38:
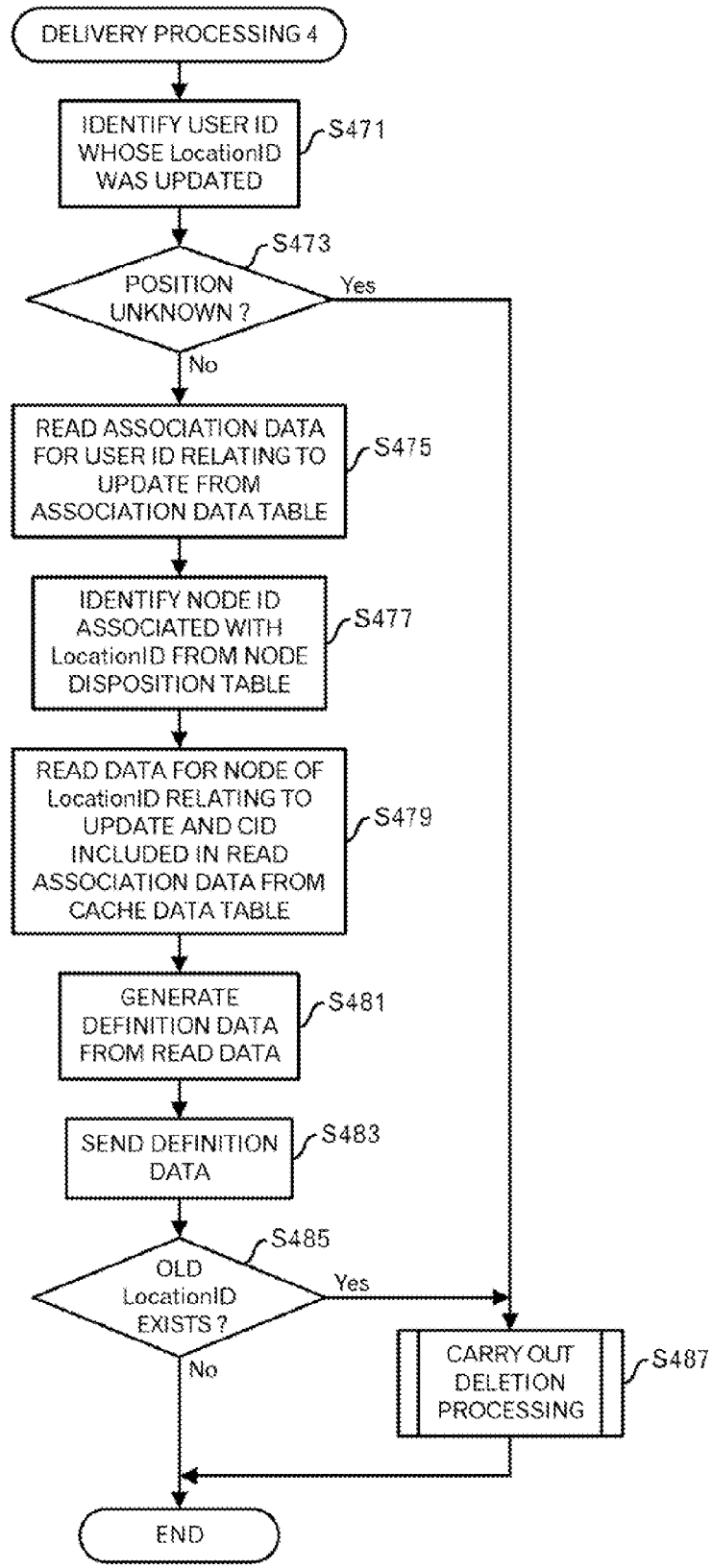
FIG. 38 is a diagram depicting a processing flow of a delivery processing in the eighth embodiment.

Next, a processing by the delivery unit 127 is explained by using FIG. 38. The delivery unit 127 identifies the user ID whose LocationID was updated in the user position table 123 (FIG. 38: step S471). Incidentally, the user ID whose LocationID was updated may be notified from the determination processing unit 125.

Then, the delivery unit 127 determines whether or not the LocationID relating to the update represents "position unknown" in the user position table 123 (step S473). When the LocationID relating to the update represents "position unknown", the delivery unit 127 or the like carries out a deletion processing (step S487). This deletion processing will be explained in detail later. Then, the processing ends.

On the other hand, when the LocationID relating to the update does not represent "position unknown", the delivery unit 127 reads the association data for the user ID relating to the update from the association data table 124 (step S475). Namely, the CID and data of the output condition, which are associated with the identified user ID, are read out. Then, the delivery unit 127 identifies, as the node IDs of the delivery destination nodes, the node IDs associated with the LocationID relating to the update from the node disposition table 122 (step S477). After that, the delivery unit 127 reads data for the node ID of the delivery destination node and CID included in the read association data from the cache data table 126 (step S479).

Then, the delivery unit 127 generates definition data from the data read at the steps S475 and S479 (step S481), and transmits the definition data to the delivery destination node identified at the step S477 (step S483).

Then, the delivery unit 127 determines whether or not an entry for the LocationID relating to the update includes the old LocationID in the user position table 123, in other words, the old LocationID is not "position unknown" (step S485).

When the entry for the LocationID relating to the update includes the old LocationID, the processing shifts to the step S487. On the other hand, when the entry for the LocationID relating to the update does not include the old LocationID, the processing ends.

Figure 39:
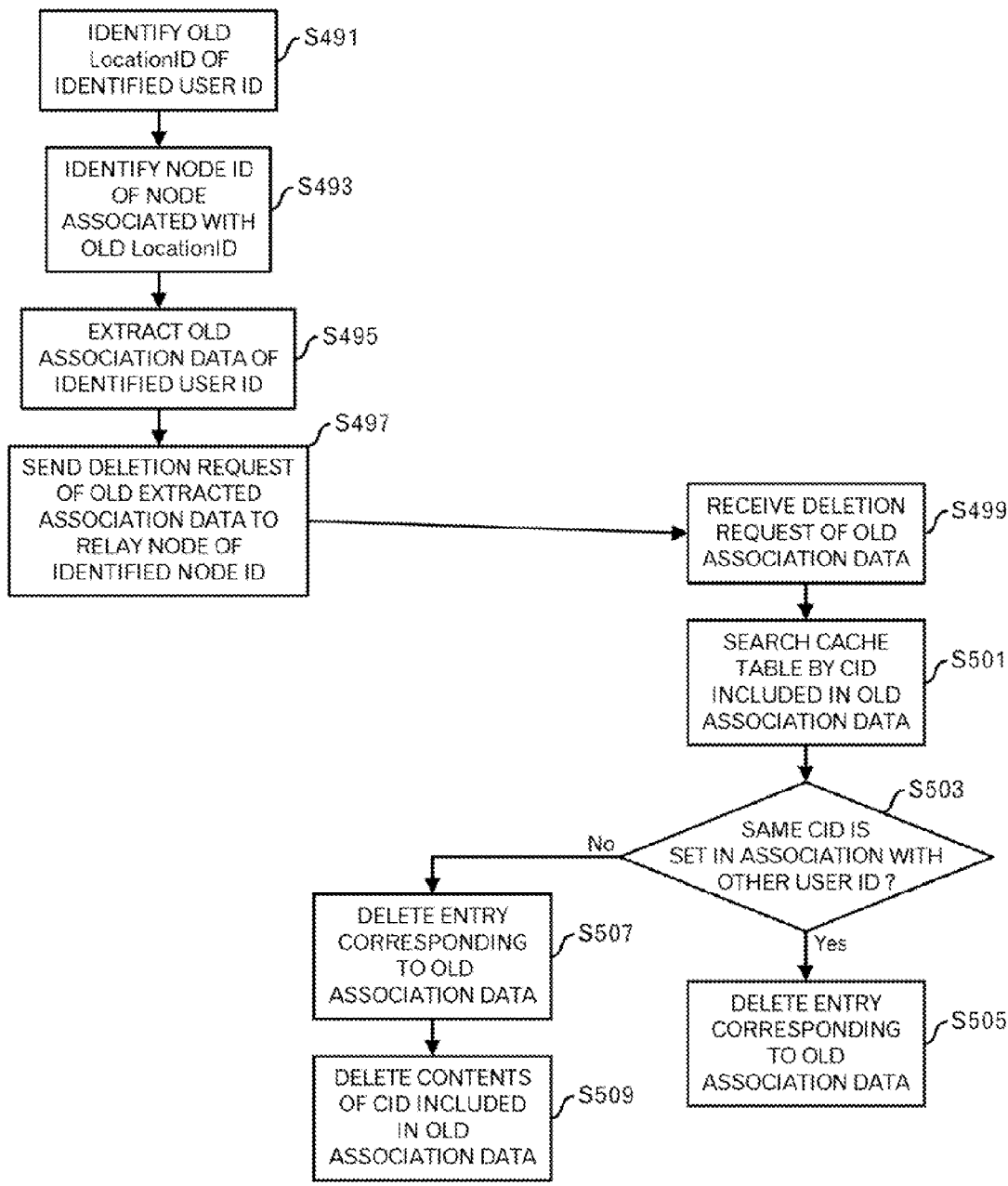
FIG. 39 is a diagram depicting a processing flow of a deletion processing.

Next, the deletion processing is explained by using FIG. 39. The delivery unit 127 of the control apparatus 120 identifies the old LocationID of the user ID identified at the step S471 in the user position table 123 (FIG. 39: step S491). Moreover, the delivery unit 127 identifies the node ID of the node associated with the old LocationID from the node disposition table 122 (step S493). Furthermore, the delivery unit 127 extracts old association data (association data whose latest update time is the second in the table) of the identified user ID from the association data table 124 (step S495). Then, the delivery unit 127 transmits a deletion request of the extracted old association data to the relay node of the node ID identified at the step S493 (step S497). The deletion request may include only user ID included in the old association data instead of the old association data itself.

On the other hand, the receiver 2211 of the relay node 221 receives the deletion request of the old association data from the control apparatus 120, and outputs the deletion request of the old association data to the cache controller 2212 (step S499). Then, the cache controller 2212 receives the deletion request of the old association data from the receiver 2211, and searches a column of the CID or file name in the cache table in the cache data storage unit 2213 by the CID included in the old association data (step S501). Instead of this processing, the cache table may be searched by the user ID to extract the corresponding CID, and the column of the CID or file name in the cache table may be searched by the CID.

Then, the cache controller 2212 determines whether or not an entry having the same CID exists in association with other user ID (step S503). When the entry having the same CID exists in association with other user ID, the data of the contents relating to the CID cannot be deleted. Therefore, the cache controller 2212 deletes an entry corresponding to the received old association data from the cache table in the cache data storage unit 2213 (step S505). Incidentally, the entry including the received user ID may be deleted.

On the other hand, when no entry having the same CID exists in association with other user ID, the cache controller 2212 deletes the entry corresponding to the received old association data from the cache table in the cache data storage unit 2213 (step S507). Then, the cache controller 2212 deletes the data of the contents relating to the CID included in the old association data from the cache data storage unit 2213 (step S509). In other words, the entry in the cache table and the data of the contents itself are deleted. By searching the cache table by the user ID to extract the corresponding CID, the data of the contents relating to the extracted CID may be deleted.

By carrying out the aforementioned processing, it is possible to delete the definition data that is no longer used in the relay nodes 221 and 222, and to efficiently use the cache data storage unit 2213.

Although the embodiments of this technique were explained above, this technique is not limited to those embodiments. For example, the functional block diagrams are mere examples, and do not always correspond to actual program module configurations. Moreover, as for the processing flow, as long as the processing results do not change, the order of the steps is changed, or the steps may be executed in parallel.

Although this was explained, the station is a mere example, and areas other than the stations may be applicable. Moreover, one or more floors in a building or sales area in a shop may be applicable.

Figure 40:
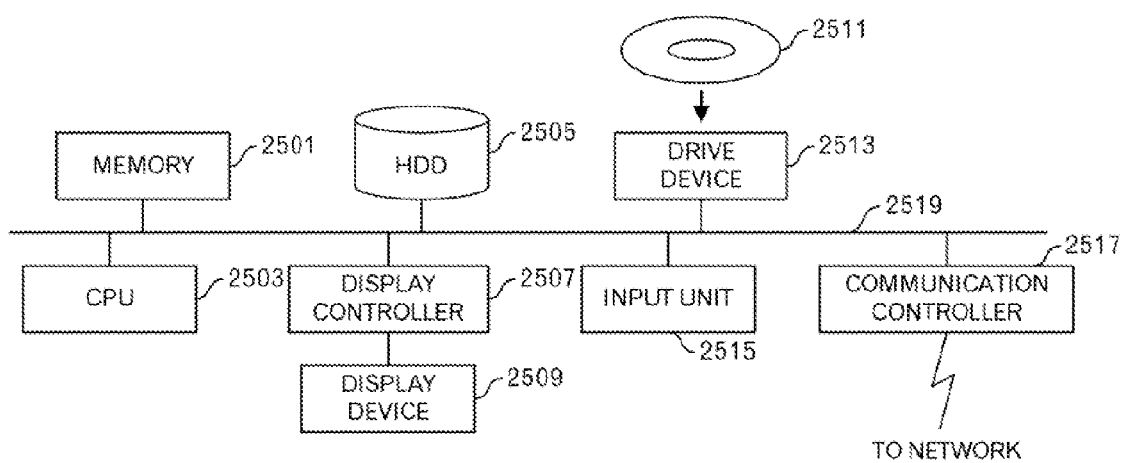
FIG. 40 is a functional block diagram of a computer.

In addition, the aforementioned analysis apparatus, control apparatus, various nodes and server are computer devices as illustrated in FIG. 40. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 40. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

A control method relating to a first aspect of the embodiments includes: (A) receiving, an identifier of a user, an identifier of contents associated with the user and identification data concerning a sensor that read the identifier of the user; (B) reading an identifier of a node associated with the received identification data or a combination of the received identification data and the received identifier of the user, from a data storage unit storing an identifier of anode that will cache contents to be outputted to a display device provided at a different position from a position of a sensor in association with identification data concerning the sensor or a combination of identification data concerning the sensor and an identifier of a user; and (C) transmitting the received identifier of the user and an identifier of contents associated with the user to a node whose identifier was read.

By transmitting the identifier of the user and the identifier of the contents associated with the user to the node identified as described above and causing the node to cache the contents that may be outputted, in other words, the contents that has possibility to be outputted, in advance, it becomes possible to output appropriate contents immediately when the user arrived at the display device.

This control method may further include: (D) upon receiving a notification representing that the contents associated with the user are not cached, from a node that is a transmission destination of the identifier of the contents associated with the user, transmitting a cache request including the identifier of the contents associated with the user to another node associated in advance with the node that is the transmission destination of the identifier of the contents. By carrying out such a processing, even when the capacity of the cache is deficient, it becomes possible to cause another node associated with the transmission destination node to cache the contents.

Furthermore, this control method may further include: (E) storing the identifier of the contents associated with the user in association with the read identified of the node into a second data storage unit; (F) receiving an identifier of a second user, an identifier of contents associated with the second user and identification data concerning a sensor that read the identifier of the second user; (G) reading, from the data storage unit, an identifier of a second node associated with the identification data concerning the sensor that read the identifier of the second user, or a combination of the identifier of the second user and the identification data concerning the sensor that read the identifier of the second user; (H) reading, from the second data storage unit, an identifier of a third node associated with the identifier of the contents associated with the second user; (I) determining whether the third node is a node associated in advance with the second node; and (J) upon detecting that the third node is the node associated with in advance with the second node, transmitting a first notification including the identifier of the second user, the identifier of the contents associated with the second user and data requesting to obtain the contents associated with the second user from the third node, or a second notification including the identifier of the second user and the identifier of the contents that are associated with the second user and for which the third node is set as a transmission source.

By avoiding the concentration of accesses, for example, to one contents server, the processing load of the server and the communication load of the network, which are caused by obtaining the contents, can be reduced.

Moreover, this control method may further include: (K) receiving the identifier of the user and second identification data concerning a second sensor that read the identifier of the user; and (L) upon detecting that the identification data is different from the second identification data, transmitting a data deletion request including the identifier of the user to a node whose identifier is read from the data storage unit. By carrying out such a processing, the data in the cache, which is no longer used because of the movement of the user to other place, can be deleted.

In addition, the receiving may include receiving an output condition of the contents, and the transmitting may include transmitting the output condition of the contents. By carrying out such a processing, it is possible to switch and output the contents according to the state.

A control method relating to a second aspect of the embodiment is executed by a first computer and includes: (A) receiving, from a second computer, an identifier of a user, an identifier of contents associated with the user and an output condition of the contents; storing the identifier of the contents associated with the user and the output condition of the contents in association with the identifier of the user into a data storage unit; (B) obtaining the contents associated with the user from a third computer by using the identifier of the contents associated with the user; (C) storing the obtained contents into the data storage unit; (D) receiving, from a display device connected to the first computer, the identifier of the user and state data; (E) reading, from the data storage unit, contents whose identifier is associated with an output condition that the received state data satisfies and the identifier of the user; and (F) outputting the read contents to the display device.

By carrying out such a processing, the contents suitable for the user and state can be prepared for the display device. Therefore, the contents can be outputted to the user, immediately.

In the control method relating to the second aspect, the aforementioned obtaining may include: (b1) receiving, from the third computer, data concerning a data volume of the contents associated with the user; and (b2) obtaining the contents associated with the user from the third computer, upon detecting the data volume of the contents is equal to or greater than a predetermined volume. By carrying out such a processing, the capacity of the data storage unit can be effectively utilized, as long as the response time to the user satisfies the requirement.

Furthermore, the control method relating to the second aspect may further include: (G) determining whether or not a capacity for storing the contents associated with the user remains in the data storage unit; (H) upon determining that the capacity for storing the contents associated with the user does not remain, transmitting a notification representing that caching is impossible to the second computer; (I) upon detecting that the contents whose identifier is associated with an output condition that the state data satisfies and the identifier of the user cannot be read from the data storage unit, obtaining the contents that cannot be read from a predetermined fourth computer; outputting the obtained contents to the display device; (J) upon determining that the capacity for storing the contents associated with the user remains, obtaining the contents associated with the user from the third computer by using the identifier of the contents associated with the user; and (K) storing the obtained contents into the data storage unit. Moreover, when it is determined at the determining that the capacity for the contents remains, the obtaining may be carried out. By utilizing the fourth computer, the deficiency of the capacity of the data storage unit is supplemented.

Furthermore, the control method relating to the second aspect of the embodiments may include: (L) receiving a data deletion request including an identifier of a second user; identifying an identifier of contents associated with the identifier of the second user from the data storage unit; (M) determining whether or not the identified identifier of the contents is associated with an identifier of a user other than the second user in the data storage unit; and (N) upon determining the identified identifier of the contents is not associated with any identifier of any user other than the second user in the data storage unit, deleting, from the data storage unit, data associating the identifier of the second user with the identifier of the contents and data of the contents whose identifier was identified in the identifying. By detecting that data is no longer used and deleting such data, the capacity of the data storage unit can be efficiently utilized.

Moreover, a system relating to a third aspect of the embodiments has a control apparatus, and plural nodes that is connected to a display device and caches contents to be outputted to the display device in advance. Then, the control apparatus has (A) a receiver that receives an identifier of a user, an identifier of contents associated with the user and identification data concerning a sensor that read the identifier of the user; (B) a first data storage unit storing an identifier of a node that will cache contents to be outputted to a display device provided at a different position from a position of a sensor in association with identification data concerning the sensor or a combination of identification data concerning the sensor and an identifier of a user; (C) an identifying unit that identifies an identifier of a node associated with the received identification data or a combination of the received identification data and the received identifier of the user, from the first data storage unit; and (D) a transmitter that transmits the received identifier of the user and an identifier of contents associated with the user to a node whose identifier was read. In addition, each of the plural nodes has: (E) a receiver that receives from the control apparatus, an identifier of a user, an identifier of contents associated with the user and an output condition of the contents, and stores the identifier of the contents associated with the user and the output condition of the contents in association with the identifier of the user into a data storage unit; (F) an obtaining unit that obtains the contents associated with the user by using the identifier of the contents associated with the user, and stores the obtained contents into the data storage unit; and (G) an output processing unit that receives from a display device connected to the information processing apparatus, the identifier of the user and state data, reads from the data storage unit, contents whose identifier is associated with an output condition that the received state data satisfies and the identifier of the user; and outputs the read contents to the display device.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process: the process comprising: first receiving, an identifier of a first user, an identifier of first contents associated with the first user and identification data concerning a first sensor that read the identifier of the first user;
   first reading an identifier of a first node associated with the identification data concerning the first sensor or a combination of the identification data concerning the first sensor and the identifier of the first user, from a first data storage unit storing an identifier of a node that caches contents in association with identification data concerning a sensor or a combination of the identification data concerning the sensor and an identifier of a user;
   first transmitting the identifier of the first user and the identifier of the first contents to the first node;
   storing the identifier of the first contents in association with the identifier of the first node into a second data storage unit storing an identifier of contents in association with an identifier of a node that has already cached the contents;
   second receiving an identifier of a second user, an identifier of second contents associated with the second user and identification data concerning a second sensor that read the identifier of the second user;
   second reading, from the first data storage unit, an identifier of a second node associated with the identification data concerning the second sensor, or a combination of the identifier of the second user and the identification data concerning the second sensor;
   determining whether an identifier of a third node that has already cached the second contents is stored in the second data storage unit;
   and upon detecting that the identifier of the third node that has already cached the second contents is stored in the second data storage unit, second transmitting to the second node, a first notification including the identifier of the second user, the identifier of the second contents and data requesting to obtain the second contents from the third node, or a second notification for which the third node is set as a transmission source and which includes the identifier of the second user and the identifier of the second contents,
   wherein the process further comprises: receiving the identifier of the first user and identification data concerning a third sensor that read the identifier of the first user; and
   upon detecting that the identification data concerning the first sensor is different from the identification data concerning the third sensor, transmitting a data deletion request including the identifier of the first user to the first node.

2. The computer-readable, non-transitory storage medium as set forth in claim 1, wherein the process further comprises: upon receiving, from the first node, a third notification representing that the first contents are not cached, transmitting a cache request including the identifier of the first contents to another node associated in advance with the first node.

3. The computer-readable, non-transitory storage medium as set forth in claim 1, wherein the first receiving comprises receiving an output condition of the first contents, and
   the first transmitting comprises transmitting the output condition of the first contents.

4. A control method, comprising: first receiving, by using a computer, an identifier of a first user, an identifier of first contents associated with the first user and identification data concerning a first sensor that read the identifier of the first user;
   first reading, by using the computer, an identifier of a first node associated with the identification data concerning the first sensor or a combination of the identification data concerning the first sensor and the identifier of the first user, from a first data storage unit storing an identifier of a node that caches contents in association with identification data concerning a sensor or a combination of the identification data concerning the sensor and an identifier of a user;
   first transmitting, by using the computer, the identifier of the first user and the identifier of the first contents to the first node;
   storing, by using the computer, the identifier of the first contents in association with the identifier of the first node into a second data storage unit storing an identifier of contents in association with an identifier of a node that has already cached the contents;
   second receiving, by using the computer, an identifier of a second user, an identifier of second contents associated with the second user and identification data concerning a second sensor that read the identifier of the second user;
   second reading, by using the computer and from the first data storage unit, an identifier of a second node associated with the identification data concerning the second sensor, or a combination of the identifier of the second user and the identification data concerning the second sensor;

determining, by using the computer, whether an identifier of a third node that has already cached the second contents is stored in the second data storage unit;

and upon detecting that the identifier of the third node that has already cached the second contents is stored in the second data storage unit, second transmitting, by using the computer and to the second node, a first notification including the identifier of the second user, the identifier of the second contents and data requesting to obtain the second contents from the third node, or a second notification for which the third node is set as a transmission source and which includes the identifier of the second user and the identifier of the second contents, wherein the process further comprises: receiving the identifier of the first user and identification data concerning a third sensor that read the identifier of the first user; and upon detecting that the identification data concerning the first sensor is different from the identification data concerning the third sensor, transmitting a data deletion request including the identifier of the first user to the first node.

5. A control apparatus, comprising: a memory; and a processor configured to use the memory and execute a process, the process comprising: first receiving, an identifier of a first user, an identifier of first contents associated with the first user and identification data concerning a first sensor that read the identifier of the first user;

first reading an identifier of a first node associated with the identification data concerning the first sensor or a combination of the identification data concerning the first sensor and the identifier of the first user, from a first data storage unit storing an identifier of a node that caches contents in association with identification data concerning a sensor or a combination of the identification data concerning the sensor and an identifier of a user;

first transmitting the identifier of the first user and the identifier of the first contents to the first node;

storing the identifier of the first contents in association with the identifier of the first node into a second data storage unit storing an identifier of contents in association with an identifier of a node that has already cached the contents;

second receiving an identifier of a second user, an identifier of second contents associated with the second user and identification data concerning a second sensor that read the identifier of the second user;

second reading, from the first data storage unit, an identifier of a second node associated with the identification data concerning the second sensor, or a combination of the identifier of the second user and the identification data concerning the second sensor;

determining whether an identifier of a third node that has already cached the second contents is stored in the second data storage unit;

and upon detecting that the identifier of the third node that has already cached the second contents is stored in the second data storage unit, second transmitting to the second node, a first notification including the identifier of the second user, the identifier of the second contents and data requesting to obtain the second contents from the third node, or a second notification for which the third node is set as a transmission source and which includes the identifier of the second user and the identifier of the second contents;

wherein the process further comprises: receiving the identifier of the first user and identification data concerning a third sensor that read the identifier of the first user; and upon detecting that the identification data concerning the first sensor is different from the identification data concerning the third sensor, transmitting a data deletion request including the identifier of the first user to the first node.

6. A system, comprising: a control apparatus;

and a plurality of nodes that is connected to a display device and caches contents to be outputted to the display device in advance, and wherein the control apparatus comprises:

a memory; and a processor configured to use the memory and execute a process, the process comprising:

first receiving an identifier of a first user, an identifier of first contents associated with the first user and identification data concerning a first sensor that read the identifier of the first user;

first reading an identifier of a first node associated with the identification data concerning the first sensor or a combination of the identification data concerning the first sensor and the identifier of the first user, from a first data storage unit storing an identifier of a node that caches contents in association with identification data concerning a sensor or a combination of identification data concerning a sensor and an identifier of a user;

first transmitting the identifier of the first user and the identifier of the first contents to the first node;

storing the identifier of the first contents in association with the identifier of the first node into a second data storage unit storing an identifier of contents in association with an identifier of a node that has already cached the contents;

second receiving an identifier of a second user, an identifier of second contents associated with the second user and identification data concerning a second sensor that read the identifier of the second user;

second reading, from the first data storage unit, an identifier of a second node associated with the identification data concerning the second sensor, or a combination of the identifier of the second user and the identification data concerning the second sensor;

determining whether an identifier of a third node that has already cached the second contents is stored in the second data storage unit; and upon detecting that the identifier of the third node that has already cached the second contents is stored in the second data storage unit, second transmitting to the second node, a first notification including the identifier of the second user, the identifier of the second contents and data requesting to obtain the second contents from the third node, or a second notification for which the third node is set as a transmission source and which includes the identifier of the second user and the identifier of the second contents, and wherein the process further comprises: receiving the identifier of the first user and identification data concerning a third sensor that read the identifier of the first user; and upon detecting that the identification data concerning the first sensor is different from the identification data concerning the third sensor, transmitting a data deletion request including the identifier of the first user to the first node, and wherein each of the plurality of nodes comprises:

a memory;

and a processor configured to use the memory and execute a process, the process comprising:

first receiving from the control apparatus, an identifier of a third user, an identifier of third contents associated with the third user;

first storing the identifier of the third contents in association with the identifier of the third user into a third data storage unit;

obtaining the third contents by using the identifier of the third contents;

second storing the third contents into the third data storage unit;

second receiving from a display device connected to an information processing apparatus, the identifier of the third user;

reading from the third data storage unit, the third contents whose identifier is associated with the received identifier of the third user;

and outputting the read third contents to the display device.

* * * * *